US010229098B2

(12) United States Patent
Grimm

(10) Patent No.: US 10,229,098 B2
(45) Date of Patent: *Mar. 12, 2019

(54) AUTOMATED PROCESSING OF TRANSCRIPTS, TRANSCRIPT DESIGNATIONS, AND/OR VIDEO CLIP LOAD FILES

(71) Applicant: Designation Station LLC, Oakland, CA (US)

(72) Inventor: Christopher John Grimm, San Francisco, CA (US)

(73) Assignee: Designation Station, LLC, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/970,842

(22) Filed: May 3, 2018

(65) Prior Publication Data

US 2018/0253411 A1   Sep. 6, 2018

Related U.S. Application Data

(63) Continuation of application No. 14/832,853, filed on Aug. 21, 2015, which is a continuation-in-part of (Continued)

(51) Int. Cl.
*G06F 17/27* (2006.01)
*G06F 17/24* (2006.01)
(Continued)

(52) U.S. Cl.
CPC ............ *G06F 17/24* (2013.01); *G06F 3/0484* (2013.01); *G06F 17/27* (2013.01); *G06Q 10/00* (2013.01); *G06Q 50/18* (2013.01); *G11B 27/11* (2013.01)

(58) Field of Classification Search
CPC ........ G06F 17/24; G06F 3/0484; G06F 17/27; G06Q 10/00; G06Q 50/18; G11B 27/11
(Continued)

(56) References Cited

U.S. PATENT DOCUMENTS 6,869,018 B2   3/2005  Fifield et al.
8,788,523 B2   7/2014  Martin et al.
(Continued)

*Primary Examiner* — Thierry L Pham
(74) *Attorney, Agent, or Firm* — Norton Rose Fulbright US LLP

(57) ABSTRACT

In an aspect, a computerized method for generating processed files of deposition testimony transcript designations may include accessing a file containing designations of contents of a textual transcript, quarantining errors in the designations, and generating a processed file containing processed designations of contents of the textual transcript having quarantined errors removed therefrom. In another aspect, a computerized method of generating designations for a deposition testimony transcript may include accessing designation information regarding designations made with respect to text of the deposition testimony transcript, accessing rules for generating designations based on the designation information, and generating the designations based on the rules. In a further aspect, a computerized method of updating designations for a deposition testimony transcript may include accessing an edited video clip list, accessing the designations for the deposition testimony transcript, comparing the edited video clip list to the designations, and updating the designations based on determined differences.

20 Claims, 37 Drawing Sheets

Related U.S. Application Data application No. 14/321,161, filed on Jul. 1, 2014, now Pat. No. 9,454,518.

(51) Int. Cl.
| | | |
|---|---|---|
| *G06F 3/0484* | (2013.01) | |
| *G11B 27/11* | (2006.01) | |
| *G06Q 10/00* | (2012.01) | |
| *G06Q 50/18* | (2012.01) | |
| *G06F 17/21* | (2006.01) | |

(58) Field of Classification Search
USPC .................................................. 704/7, 9, 257
See application file for complete search history.

(56) References Cited

U.S. PATENT DOCUMENTS

| | | |
|---|---|---|
| 9,015,098 B1 | 4/2015 | Crosley |
| 10,013,407 B2 * | 7/2018 | Grimm .................. G06Q 10/00 |
| 2003/0122860 A1 | 7/2003 | Ino |
| 2010/0092088 A1 | 4/2010 | Roman |
| 2011/0320198 A1 | 12/2011 | Threewitts |
| 2013/0334300 A1 | 12/2013 | Evans |
| 2014/0289617 A1 | 9/2014 | Rajagopalan |

\* cited by examiner

FIG. 6

Page 4

1    Notary Public, was examined and testified as follows:
2                    EXAMINATION
3    By Mr. Bond:
4    Q.   Stacy, would you state your name for the
5    record.
6    A.   Stacy King.
7    Q.   You're an attorney; is that right?
8    A.   Yes, I am.
9    Q.   How long have you been in private
10   practice?
11   A.   Approximately 15 years.
12   Q.   Has the bulk of that practice been in the
13   context of commercial litigation?
14   A.   Probably the bulk of it, yeah.
15   Q.   Prior to representing GFC in the Cave-Corp
16   case, have you been involved in representing lenders in a
17   lawsuits against debtors and other people involved in a
18   lending transaction?
19   A.   Yes.
20   Q.   On many occasions?
21   A.   Depends on how you define "many."
22   Q.   How many occasions?
23   A.   I don't really know.
24   Q.   More than five?
25   A.   Certainly.

| | A | B | C | D | E | F |
|---|---|---|---|---|---|---|
| 1 | Errors | | | | | |
| 2 | | | | | | |
| 3 | Name | Date | Note | Column | Designation | Error |
| 4 | Lincoln, Abraham (Vol. 01) | 6/18/2003 | | Defendant Counter | 5:15-1 | 5:15-1: Start lines occur after the end lines. |
| 5 | Lincoln, Abraham (Vol. 02) | 6/19/2003 | | Defendant Affirmative | 15:12-26 | 15:12-26: End page is invalid. |
| 6 | Lincoln, Abraham (Vol. 02) | 6/19/2003 | | Plaintiff Affirmative | 10:10-9 | 10:10-9: Start lines occur after the end lines. |
| 7 | Revere, Paul (Vol. 03) | 1/16/2009 | | Defendant Affirmative | 12-12 | 12-12: End page is invalid. |
| 8 | Washington, George (Vol. 02) | 10/17/2013 | | Defendant Affirmative | 19 | 19: Start component has an invalid number of sub-components. |
| 9 | Smith, John (Vol. 01) | 6/24/2015 | | Plaintiff Affirmative | 13-1-131-4 | 13-1-131-4: End line is out of range. |
| 10 | Smith, John (Vol. 02) | 6/25/2015 | | Plaintiff Affirmative | 20:15-19:7 | 20:15-19:7: Start lines occur after the end lines. |

| | A | B | C | D | E | F | G |
|---|---|---|---|---|---|---|---|
| 1 | Objections | | | | | | |
| 2 | | | | | | | |
| 3 | Name | Date | Note | Column | Designation | [OBJ] Page:Line | Text |
| 4 | Lincoln, Abraham (Vol. 03) | 6/20/2003 | | Plaintiff Affirmative | 255:01-255:03 | 255:02 | 2 MR. PRATT: I'll object to the form. |
| 5 | Lincoln, Abraham (Vol. 03) | 6/20/2003 | | Plaintiff Affirmative | 265:02-265:09 | 265:03 | 3 MR. PRATT: Object to form. That |
| 6 | Lincoln, Abraham (Vol. 03) | 6/20/2003 | | Plaintiff Affirmative | 273:01-273:09 | 273:01 | 1 MR. PRATT: Objection as to form |
| 7 | Lincoln, Abraham (Vol. 03) | 6/20/2003 | | Plaintiff Affirmative | 294:09-294:14 | 294:12 | 12 MR. CARBOY: Note my objection. |
| 8 | Lincoln, Abraham (Vol. 03) | 6/20/2003 | | Plaintiff Affirmative | 296:09-296:20 | 296:13 | 13 MR. CARBOY: Objection; lacks |

FIG. 18L

| | A | B | C | D | E | F | G |
|---|---|---|---|---|---|---|---|
| 1 | Run Times | | | | | | |
| 2 | | | | | | | |
| 3 | Name | Date | Vol. | Plaintiff Affirmative | Defendant Counter | Defendant Affirmative | Plaintiff Counter |
| 4 | Lincoln, Abraham | 6/18/2003 | 01 | 00:08:08 | 00:06:13 | 00:07:21 | |
| 5 | Lincoln, Abraham | 6/19/2003 | 02 | 00:08:07 | 00:08:06 | 00:08:32 | |
| 6 | Lincoln, Abraham | 6/20/2003 | 03 | 00:08:16 | | N/A | |
| 7 | Tell, William | 6/28/2003 | 01 | | | | |
| 8 | Revere, Paul | 11/7/2008 | 04 | 00:05:51 | N/A | | |
| 9 | Tell, William | 11/7/2008 | 02 | | | | |
| 10 | Revere, Paul | 1/16/2009 | 03 | 00:09:27 | | 00:22:54 | 00:06:17 |
| 11 | Washington, George | 10/15/2013 | 01 | N/A | | | |
| 12 | Washington, George | 10/17/2013 | 02 | | | N/A | N/A |
| 13 | Smith, John | 6/24/2015 | 01 | N/A | | N/A | |
| 14 | Smith, John | 6/25/2015 | 02 | 00:1:15 | | 00:00:24 | |
| 15 | Smith, John | 7/4/2015 | 03 | N/A | | N/A | |
| 16 | Smith, John | 8/11/2015 | 04 | | | | |

FIG. 18M

Page 10

1 being said here today. So I ask that we try not to
2 speak over each other. Let me finish my question before
3 you begin your answer, and I'll let you finish your
4 answer before I start a new question.
5       Is that okay?
6   A   Sure.
7   Q   You are under oath and you're giving your
8 testimony here today as if you were giving it in a court
9 of law.
10      Do you understand that?
11  A   Understood.

2210

2220

2230

2240

25          MR. SIEGEL: And I will mark it as an exhibit,

FIG. 22A

```
Page 5

1      Q     Have you ever had your deposition taken
 2  before?
 3      A     I have.
 4      Q     Approximately how many times?
 5      A     I want to say approximately three to five
 6  times.
 7            MR. WALLERSTEIN: Mr. Siegel, sorry to
 8  interrupt. I just want to put on the record that
 9  Mr. Talley is present in the room, who I understand is a
10  retained expert for Questcor.
11            MR. SIEGEL: That's correct.
12  BY MR. SIEGEL
13      Q     Approximately when was the last time you had
14  your deposition taken?
15      A     I believe it was in May, May of 2014.
16      Q     And that was also as an expert witness?
17      A     It was.
18      Q     I'm going to go through some of the basic
19  ground rules for the deposition process just so you
20  understand them, even though I understand you've done it
21  a few times already.
22            It's a question-and-answer format. I'll be
23  asking the questions. You'll be giving the answers.
24  There is a court reporter sitting to your right who is
25  writing down everything, transcribing everything that's
```

2250

FIG. 22B

AUTOMATED PROCESSING OF TRANSCRIPTS, TRANSCRIPT DESIGNATIONS, AND/OR VIDEO CLIP LOAD FILES

CROSS-REFERENCE TO RELATED APPLICATIONS

The present application is a continuation of U.S. patent application Ser. No. 14/832,853 filed Aug. 21, 2015 and entitled "AUTOMATED PROCESSING OF TRANSCRIPTS, TRANSCRIPT DESIGNATIONS, AND/OR VIDEO CLIP LOAD FILES," which is a continuation-in-part of U.S. patent application Ser. No. 14/321,161 filed Jul. 1, 2014 and entitled "AUTOMATED PROCESSING OF TRANSCRIPTS WITH TRANSCRIPT DESIGNATIONS," issued Sep. 27, 2016 as U.S. Pat. No. 9,454,518. The present application is also related to commonly assigned U.S. patent application Ser. No. 15/272,156 filed Sep. 21, 2016 and entitled "AUTOMATED PROCESSING OF TRANSCRIPTS, TRANSCRIPT DESIGNATIONS, AND/OR VIDEO CLIP LOAD FILES." The disclosures of the above-identified applications are incorporated by reference herein in their entirety.

TECHNICAL FIELD

The present application relates to automated processing of transcripts, transcript designations, and/or video clips.

BACKGROUND

Today's legal trials frequently make use of deposition transcripts and closed captioned videos as exhibits that may be used to refresh the recollection of witnesses, impeach witnesses, or in lieu of testimony. Trial judges may require opposing parties to provide affirmative and counter designations in a deposition transcript, set limits on the runtime of video exhibits, and prohibit duplicate exhibits. The requirements set by judges can be imposed late in the trial preparation process or even during trial, leading to an urgent revision process at a difficult time.

Currently, making designations which correspond to deposition testimony of a deposition transcript is primarily a manual process. For example, trial attorneys manually select deposition testimony by highlighting portions of a deposition transcript. At this stage, errors may arise due to multiple trial attorneys designating the same portions of testimony. Then, paralegals manually convert these highlighted portions of the deposition transcript into a table or list of designations indicating the page and line numbers at which the designations begin and end. At this stage, more errors may arise due to typographical errors or due to multiple paralegals using different formats for the designations. Next, a trial technician manually feeds the designations into a video generation program. At this stage, the trial technician may spend significant time identifying and correcting errors, but other errors may also be generated, such as more typographical errors. The transcript/video generation program may then perform limited error checking to ensure that the manual designations are valid before generating a video from the designations. If any errors are found, the transcript/video generation program may identify which designations were found to be invalid. However, current systems are not always accurate with error reporting and it sometimes becomes difficult to pinpoint or ascertain errors that are present in designations. When presented with errors, a trial technician must then manually correct or remove these invalid designations before a processed transcript and/or video can be generated. Such correction may require further inquiries to the designating attorneys/paralegals, which stalls the process of generating the designated testimony documentation or video content. If significant overlapping of designations is present, then the runtime of the video may be a poor estimate of the actual runtime that may be ultimately achieved by removal of overlap. Accordingly, these delays can create further logistical problems because a trial tech is not able to determine run times for the designated content and whether a need to reduce designation scope is present.

Current video transcript systems are further hindered by existing methods of making designations. For example, portions of the video generated by the video generation program may be adjacent to other video portions in time. For example, if one designation corresponds to a part of the deposition transcript that ends at the end of a page, and if another designation corresponds to another part of the deposition transcript that begins at the beginning of the next page, current video generation programs are unable to combine the designations to generate a smooth video transition. In this case, the trial technician must manually delete one of the video portions and extend the other video to obtain the desired video. This manual editing process is time consuming and prone to errors that can lead to loss of data.

BRIEF SUMMARY

In an aspect, a method for generating processed files of deposition testimony transcript designations includes accessing, by one or more computer processors, a file containing designations of contents of a textual transcript. The method additionally includes quarantining, by the one or more computer processors, errors in the designations contained in the file. The method also includes generating, by the one or more computer processors, a processed file containing processed designations of contents of the textual transcript having quarantined errors removed therefrom.

In an aspect, a method of generating designations for a deposition testimony transcript includes accessing, by one or more computer processors, designation information regarding designations made with respect to text of the deposition testimony transcript. The method additionally includes accessing, by one or more computer processors, rules for generating designations based on the designation information. The method also includes generating, by the one or more computer processors, the designations based on the rules.

In an aspect, a method of updating designations for a deposition testimony transcript includes accessing, by one or more computer processors, an edited video clip list. The method additionally includes accessing, by the one or more computer processors, the designations for the deposition testimony transcript. The method also includes comparing, by the one or more computer processors, the edited video clip list to the designations to determine differences. The method further includes updating, by the one or more computer processors, the designations based on the determined differences.

In an aspect, a computer program product includes a non-transitory computer-readable medium having instructions recorded thereon that, when executed by one or more computer processors, cause the one or more computer processors to access a file containing designations of contents of a textual transcript. The instructions additionally cause the one or more computers to quarantine errors in the designations contained in the file. The instructions also cause the one or more computers to generate a processed file containing processed designations of contents of the textual transcript having quarantined errors removed therefrom.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which:

FIG. 6 illustrates a computer-processed file containing two sets of processed designations of contents of the textual transcript having quarantined errors removed therefrom in accordance with the present disclosure;

FIG. 9 illustrates a computer-processed and marked up textual transcript in accordance with the present disclosure;

FIG. 18E is a diagram of an illustrative embodiment of a process designations interface for processing designations made with respect to deposition testimony transcripts for one or more deponents;

FIG. 18J is a diagram of an illustrative embodiment of an error log associated with a designation project;

FIG. 18K is a diagram of an illustrative embodiment of a collection of designations associated with a designation project;

FIG. 18L is a diagram of an illustrative embodiment of an objection log associated with a designation project;

FIG. 18M is a diagram of an illustrative embodiment of a run-time log associated with a designation project;

FIG. 22A is a diagram of an illustrative embodiment of an output generated in connection with a designation project;

FIG. 22B is diagram of another illustrative embodiment of an output generated in connection with a designation project.

DETAILED DESCRIPTION

Figure 1:
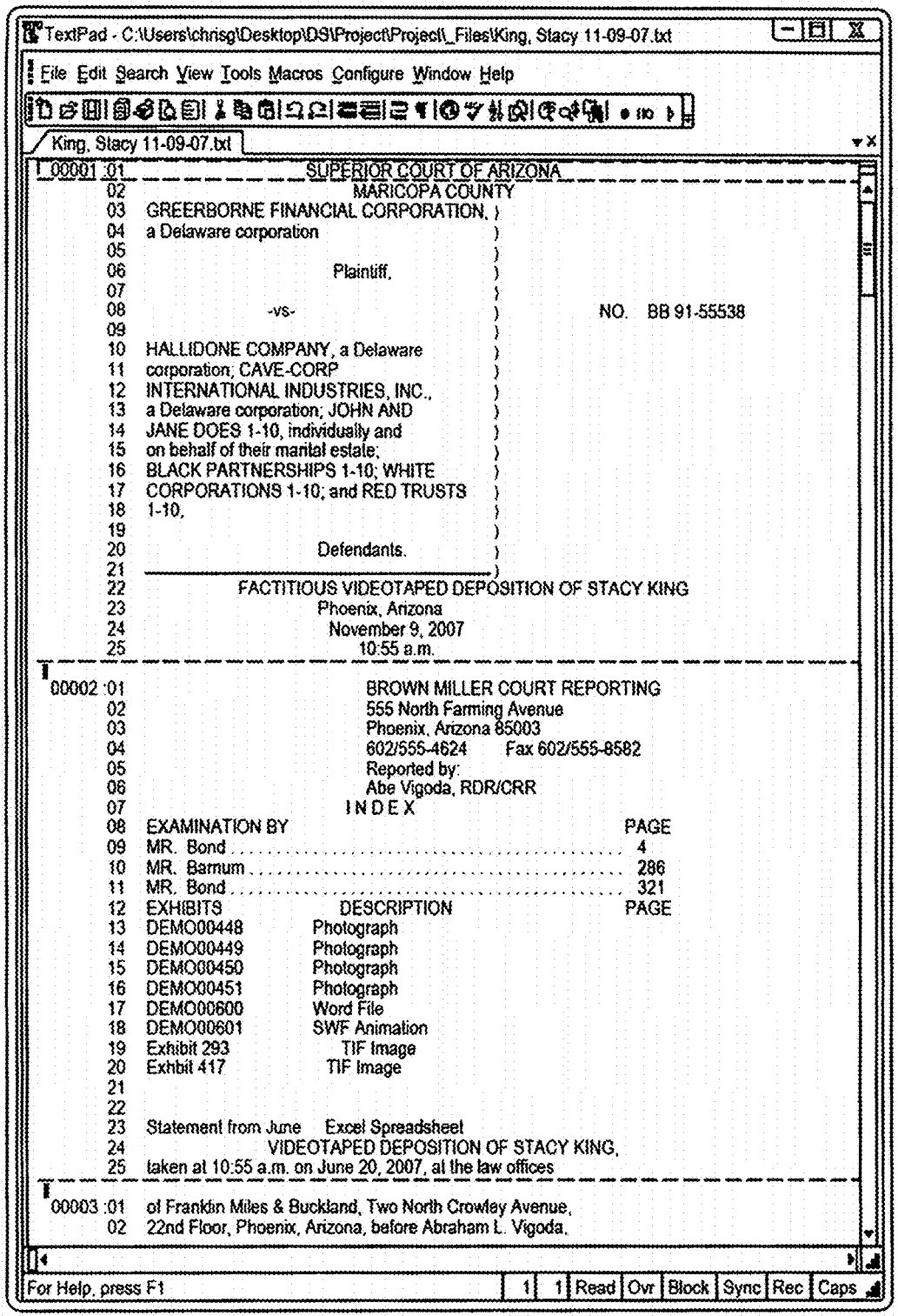
FIG. 1 illustrates a textual transcript of deposition testimony in accordance with the present disclosure.

The present disclosure provides a computer-implemented process that automates many of the tasks normally performed by a paralegal or trial technician. In some aspects, the computer-implemented process automates generation of processed files of deposition testimony transcript designations. In additional aspects, the computer-implemented process automates generation of a processed and marked up textual transcript. In other aspects, the computer-implemented process automates generation of deposition testimony transcript designations. In other additional aspects, the computer implemented process automatically finds objections in deposition testimony transcripts and calculates designation run-times. In further aspects, the computer-implemented process automates processing of video clips having time codes. In still further aspects, the computer-implemented process automates comparison of designations and/or update of designations.

Advantageously, the computer-implemented process disclosed herein may quarantine errors in a file of deposition testimony transcript designations. An accompanying quarantine report allows attorneys to quickly resolve any errors that are encountered early in the process. The quarantine function may also allow use of the error free designations without first resolving all errors. For example, the error free designations may be employed to generate the processed video without first correcting all errors in the designations. This capability advantageously permits runtime and other properties of the processed video to be assessed earlier than would otherwise be possible. By assessing runtime of the processed video earlier in the process, determination may be made whether attorneys have over designated contents of the deposition testimony transcript, and begin making adjustments accordingly. Additionally, the error free designations may be used to generate the processed and marked up textual transcript without first correcting all errors in the designations. This capability advantageously provides a marked up hard or soft copy of the transcript that the attorneys may refer to during an editing process in which the invalid designations are clarified and/or the aforementioned over designation problem is addressed.

In additional aspects, the computer-implemented process may automatically remove overlap of designations and/or combine adjacent designations by page, line number, and the like. A user interface may permit setting of line ranges for individual transcripts or designation sets, and these line ranges may be employed in the process of combining adjacent designations and removing overlap. It is also provided that batch processing may be utilized to automatically process designations, which can be used to generate processed videos and processed and marked-up textual transcripts for large numbers of depositions taken with respect to large numbers of witnesses involved in a trial. Advantageously, these capabilities may reduce the time required in editing exhibits by one or many orders of magnitude. These and other capabilities of the computer-implemented process are described in greater detail below with respect to FIG. 1 to FIG. 16.

FIG. 1 illustrates a textual transcript 100 of deposition testimony. For example, the textual transcript 100 may have page numbers 102 and line numbers 104 as will be readily appreciated by one skilled in the art. The textual transcript 100 may be stored electronically in a non-transitory computer-readable medium and displayed or printed at need by a computer processor. As will be readily understood by one skilled in the art, attorneys representing parties in a trial may mark up printed versions of such transcripts by highlighting, underlining, or otherwise indicating text of the transcript to be designated as a plaintiff affirmative, a defense counter, a defense affirmative, and/or a plaintiff counter.

Figure 2:
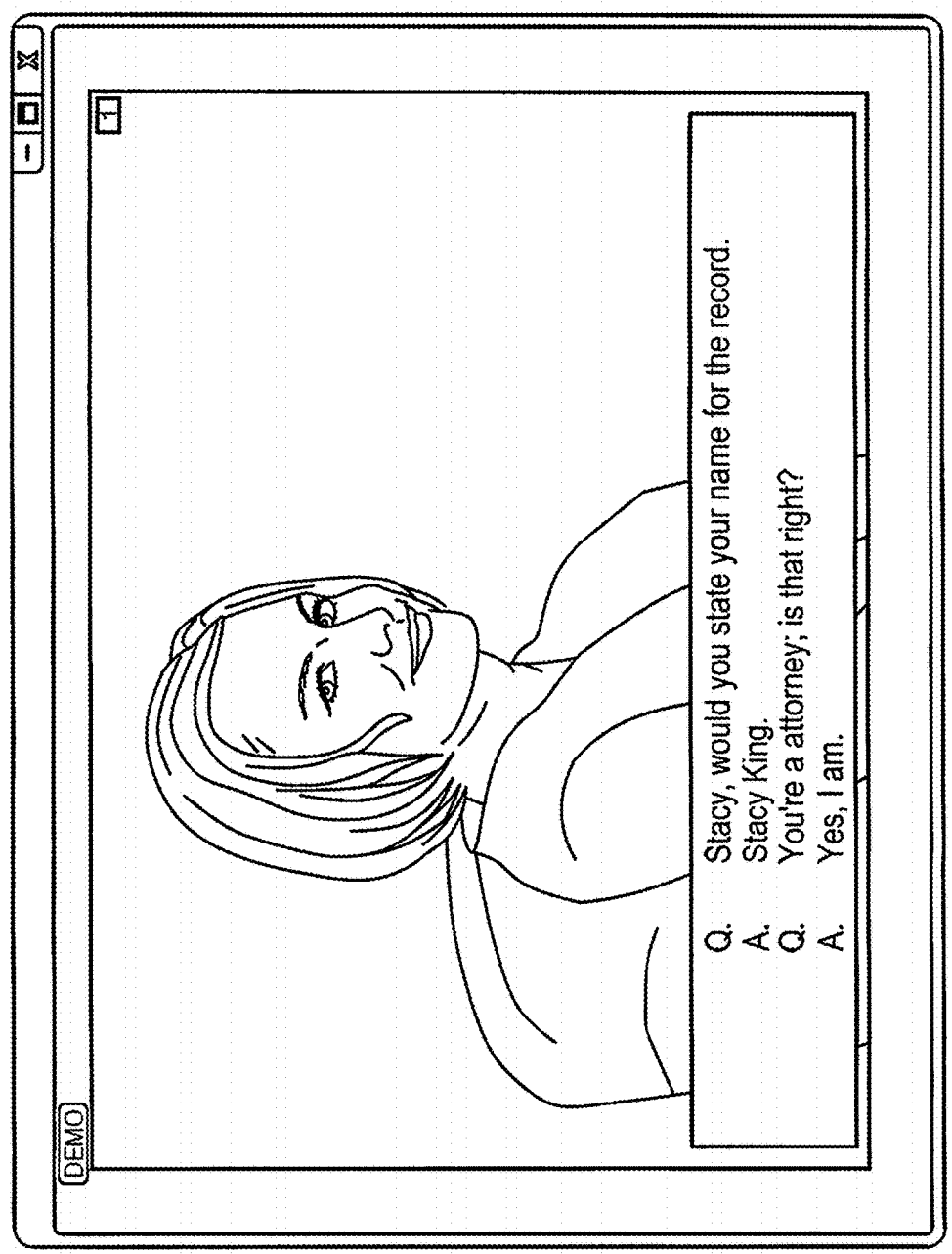
FIG. 2 illustrates a video of the deposition testimony of FIG. 1 in accordance with the present disclosure.
Figures 3, 4:
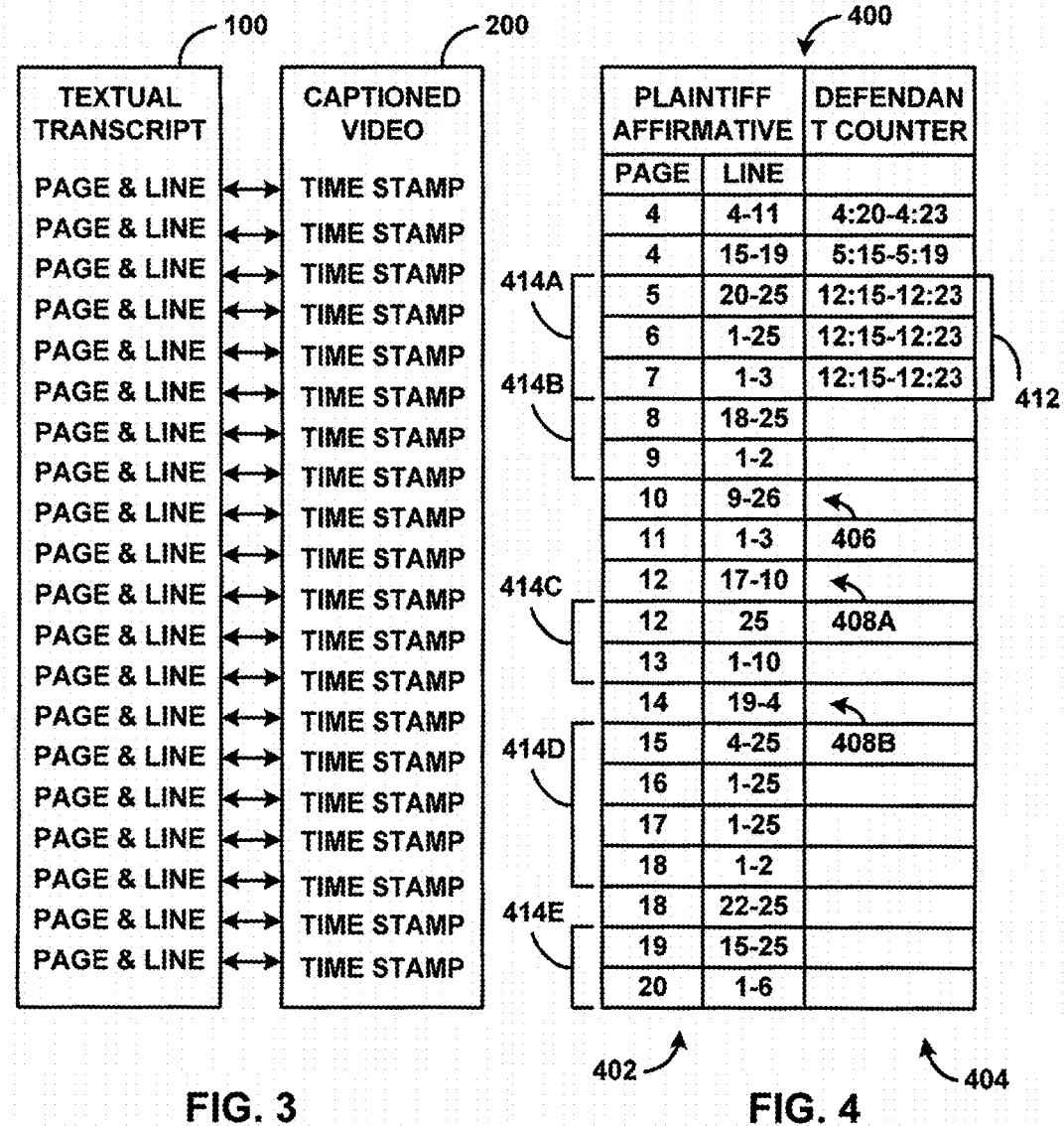
FIG. 3 illustrates the textual transcript of FIG. 1 synchronized with the video of FIG. 2 in accordance with the present disclosure.
FIG. 4 illustrates a file containing two sets of designations of contents of the textual transcript of FIG. 1 in accordance with the present disclosure.

FIG. 2 illustrates a video 200 of the deposition testimony of FIG. 1. The video 200 may have captions corresponding to the text of the textual transcript 100 of FIG. 1. As shown in FIG. 3, the textual transcript 100 of FIG. 1 may be synchronized with the video 200 of FIG. 2, such that a designation of a page and line number may be used to designate either or both of corresponding content of the textual transcript and the video. One skilled in the art will readily recognize that a computer-implemented program may be used to automatically recognize audio of the video that corresponds to text of the transcript. Such a computer-implemented program may automatically synchronize text of the textual transcript 100 with time stamps of the video 200, and automatically generate closed captions for the video 200 based on the corresponding text of the textual transcript 100.

FIG. 4 illustrates a file 400 containing two sets of designations of contents for two manually marked up copies of the textual transcript 100 of FIG. 1. Such a file 400 may be generated, for example, by paralegals manually entering the designations in a spreadsheet, wherein rows correspond to data entries containing designations expressed as page and line numbers, and columns correspond to pre-defined categories of the designations. For example, one column may correspond to a plaintiff affirmative category 402 for designations made in one marked up copy of the transcript, and another column may correspond to a defendant counter category 404 for designations made in another marked up copy of the transcript. Additional columns may be employed for additional categories, such as a defendant affirmative category for designations made in yet another marked up copy of the transcript, and a plaintiff counter category for designations made in still another marked up copy of the transcript. Further, as shown, designations in these columns may be provided in a single format or multiple formats and processed accordingly.

It should be appreciated that the designations of file 400 may include errors or other undesirable characteristics. For example, a designation may be invalid because a page number is out of range as at invalid designation 406, because an ending line number is less than a starting line number as at invalid designation 408A and invalid designation 408B, or because a format of the designation cannot be recognized. Additionally, it may not be desirable for overlap of entries to be present as at 412. Also, a single designation spanning multiple pages may be preferred over adjacent designations, such as adjacent designations 414A-414E that end at the last line of one page and begin at the first line of an adjacent page, or adjacent designations that end at one line of a page, and begin at a next line of the same page. As described below with reference to FIG. 5, a computer-implemented process disclosed herein may quarantine errors, such as invalid designations 406, 408A, and 408B, to yield a processed file free of invalid designations and, if desired, also remove overlap and/or combine adjacent designations.

Figure 5:
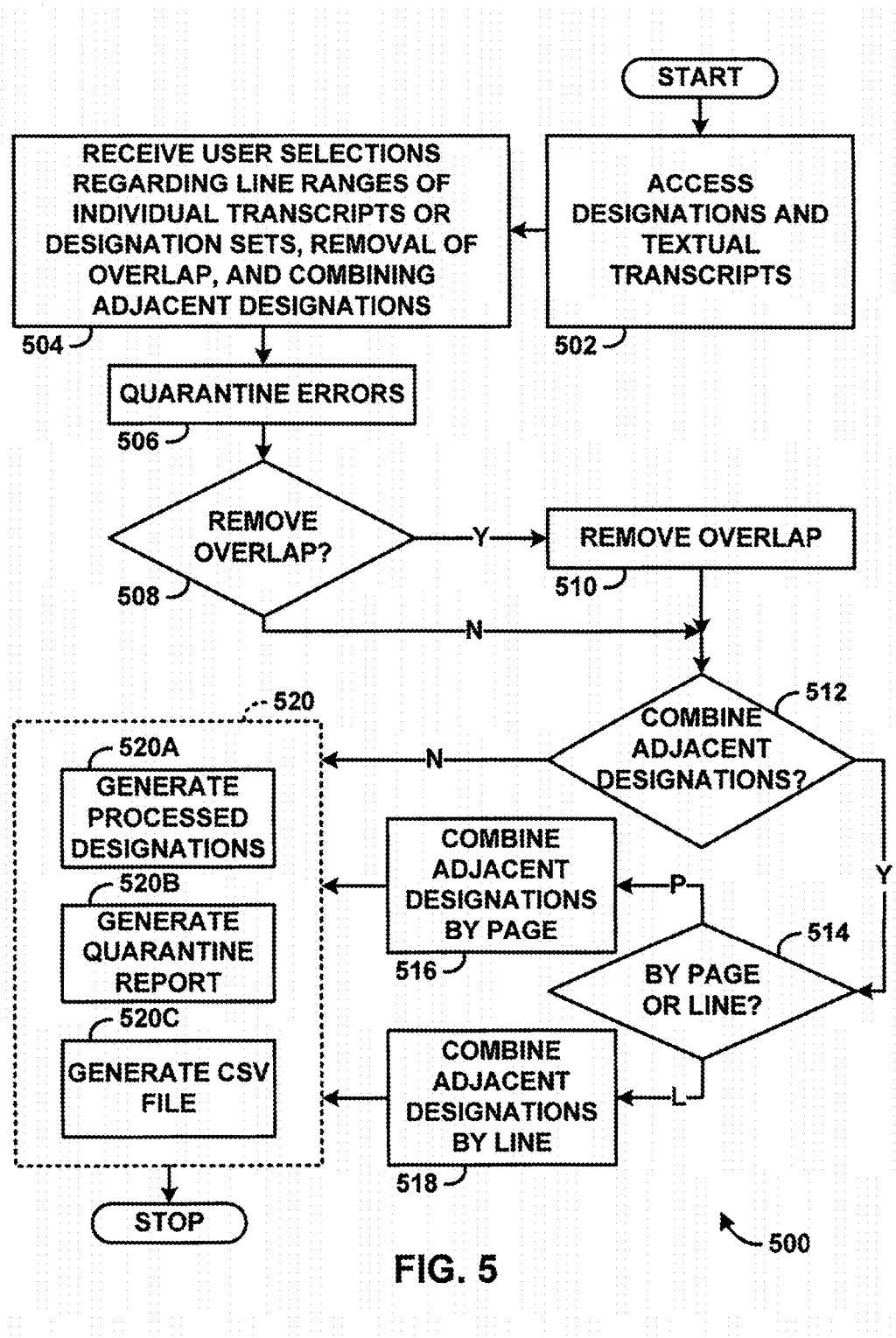
FIG. 5 illustrates a computer-implemented method for generating processed files of deposition testimony transcript designations in accordance with the present disclosure.

FIG. 5 illustrates a computer-implemented method 500 for generating processed files of deposition testimony transcript designations in accordance with the present disclosure. Beginning at block 502, one or more computer processors may access one or more electronic files containing designations and, optionally, a textual transcript. For example, the one or more computer processors may receive one or more of the one or more electronic files over an interface or communication link. Alternatively or additionally, the one or more computer processors may access one or more non-transitory computer-readable media storing one or more of the one or more files. It is envisioned that a user interface may receive a selection of an electronic folder form a user, and thereby access a folder containing the one or more electronic files. Alternatively or additionally, it is envisioned that the computer may access the electronic files based on a file naming methodology utilized to indicate that the files relate to one another. Accordingly, it is envisioned that a user may designate a folder containing multiple sets of designations and textual transcripts, and perform batch processing using the file naming methodology to determine which designations and textual transcripts relate to one another. Processing may proceed from block 502 to block 504.

At block 504, the one or more computer processors may receive user selections regarding removal of overlapping designations (e.g. from two designations having overlapping subject matter) and combining adjacent designations, as well as setting individual line ranges for a specific transcript or designation set on a specific date. For example, it is envisioned that the interface may inform the user of the number of lines per page in the textual transcript, and that the user may edit this information if desired. Alternatively or additionally, a command line user interface may ask the user to supply a number of lines per page. The user interface may further prompt the user to select whether to remove overlap, and then, after the user selects whether to remove overlap, ask the user whether to combine adjacent designations (or vice versa). In response to the user selecting to combine designations, the interface may ask the user whether to combine by page or by line, and a corresponding selection may be received. It is also envisioned that a graphical user interface may be employed instead of, or in addition to, a command line interface. Processing may proceed from block 504 to block 506.

At block 506, the one or more computer processors may quarantine errors in the designations. For example, the designations may be processed sequentially in order of foremost beginning page and line number to hindmost beginning page and line number to determine if they are invalid. As previously mentioned, a designation may be invalid because a page number is out of range, because an ending line number is less than a starting line number, or because a format of the designation cannot be recognized. Any designations determined to be invalid may be copied to the quarantine log file and removed from the designations. In some cases, both portions that overlap may be processed and not be recognized as errors in designations. Once all errors have been quarantined, processing may proceed from block 506 to block 508.

At block 508, a determination may be made whether the user selected to remove overlap. If it is determined, at block 508, that the user selected to remove overlap, then processing may proceed from block 508 to block 510. However, if it is determined, at block 508, that the user selected not to remove overlap, then processing may proceed to block 512.

At block 510, the one or more computer processors may remove overlap in the designations. For example, the two or more sets of designations may be joined together, and the designations may be sorted and formatted by page and line numbers so that everything is sequential. The designation having the first page and line may be designated as a previous designation and the next designation may be designated as a current designation. Additionally, if the current designation begins before the end of the previous designation, and if the current designation ends before the end of the previous designation, then the current designation may be removed. Also, if the current designation begins before the end of the previous designation, and if the current designation ends after the end of the previous designation, then the end of the previous designation may be replaced with the end of the current designation. The next designation may then be designated as the current designation, and the process may be repeated. If there is no overlap found between the previous and current designations, then the current designation may be designated as the previous designation, the next designation may be designated as the current designation, and the process may repeat. Processing may repeat in this manner until all designations are processed. It is envisioned that metadata may identify which designations are plaintiff affirmatives, defendant counters, defendant affirmatives, and plaintiff counters so that the designations may be sorted into separate files. Alternatively, plaintiff affirmatives may be processed separately form defendant counters, etc. In this case, the process may not include joining two or more sets of designations together. Once all overlap has been removed, processing may proceed from block 510 to block 512.

At block 512, the one or more computer processors may make a determination whether the user selected, at block 504, to combine adjacent designations. If it is determined, at block 512, that the user selected to combine designations, then processing may proceed from block 512 to block 514. However, if it is determined, at block 512, that the user did not select to combine designations, then processing may proceed from block 512 to block 520.

At block 514, the one or more computer processors may determine whether the user selected, at block 504, to combine adjacent designations by line number, either by continuing the designation to the next page or by combining any adjacent line numbers. If it is determined, at block 514, that the user selected to combine designations by page number, then processing may proceed from block 514 to block 516. However, if it determined, at block 514, that the user selected to combine by line number, then processing may proceed form block 514 to block 518.

At block 516, the one or more computer processors may, by using the line ranges set per transcript or designation set, combine adjacent designations that end at the last line of one page and begin at the first line of a next page. For example, the designations may be processed sequentially in order of foremost beginning page and line number to hindmost beginning page and line number. During the processing of a current designation and a next designation, a determination may be made whether the current designation ends on the last line of one page and the next designation begins on a first line of a next page. If it is determined that the current designation ends on the last line of one page and the next designation begins on a first line of a next page, then a new designation may be created that begins on the same page and line number as the current designation, and that ends on the same page and line number as the next designation. Then, the current and next designations may be removed from the designations, without being added to the quarantine log file, and the new designation may be added to the designations and set as the current designation for further processing. However, if it is determined that the current designation does not end on the last line of one page or that the next designation does not begin on the first line of the next page, then the next designation may be set as the current designation for further processing. In some implementations, it is envisioned that counter designations adjacent to affirmative designations may not be combined. Thus, the combination of adjacent designations may be based on designation type. Once all designations have been processed, then processing may proceed from block 516 to block 520.

At block 518, the one or more computer processors may, by using the line ranges set per transcript or designation set, combine adjacent designations that end at one line of a page, and begin at a next line of the same page, or that end at the last line of one page and begin at the first line of a next page. For example, the designations may be processed sequentially in order of foremost beginning page and line number to hindmost beginning page and line number. During the processing of a current designation and a next designation, a determination may be made whether the current designation ends at one line of a page and the next designation begins at a next line of the same page, or if the current designation ends on the last line of one page and the next designation begins on a first line of a next page. If it is determined that the current designation ends at one line of a page and the next designation begins at a next line of the same page, or that the current designation ends on the last line of one page and the next designation begins on a first line of a next page, then a new designation may be created that begins on the same page and line number as the current designation, and that ends on the same page and line number as the next designation. Then, the current and next designations may be removed from the designations, without being added to the quarantine log file, and the new designation may be added to the designations and set as the current designation for further processing. However, if it is determined that the current designation ends at one line of a page and the next designation does not begin at a next line of the same page, and that the current designation does not end on the last line of one page or that the next designation does not begin on the first line of the next page, then the next designation may be set as the current designation for further processing. In some implementations, it is envisioned that counter designations adjacent to affirmative designations may not be combined. Once all designations have been processed, then processing may proceed from block 518 to block 520.

At block 520, the one or more computer processors may generate processed designations at block 520A, generate a quarantine report at block 520B, and generate a comma separated values (CSV) file at block 520C. For example, if the user selected, at block 504, to remove overlap and/or combine adjacent designations, then the designations returned at block 520A may also have overlap removed and adjacent designations combined, as previously described. Also, the quarantine log file may be returned as the quarantine report. Further, the separate text files containing the different types of processed designations may be joined together into a CSV file at block 520C.

Figure 6:
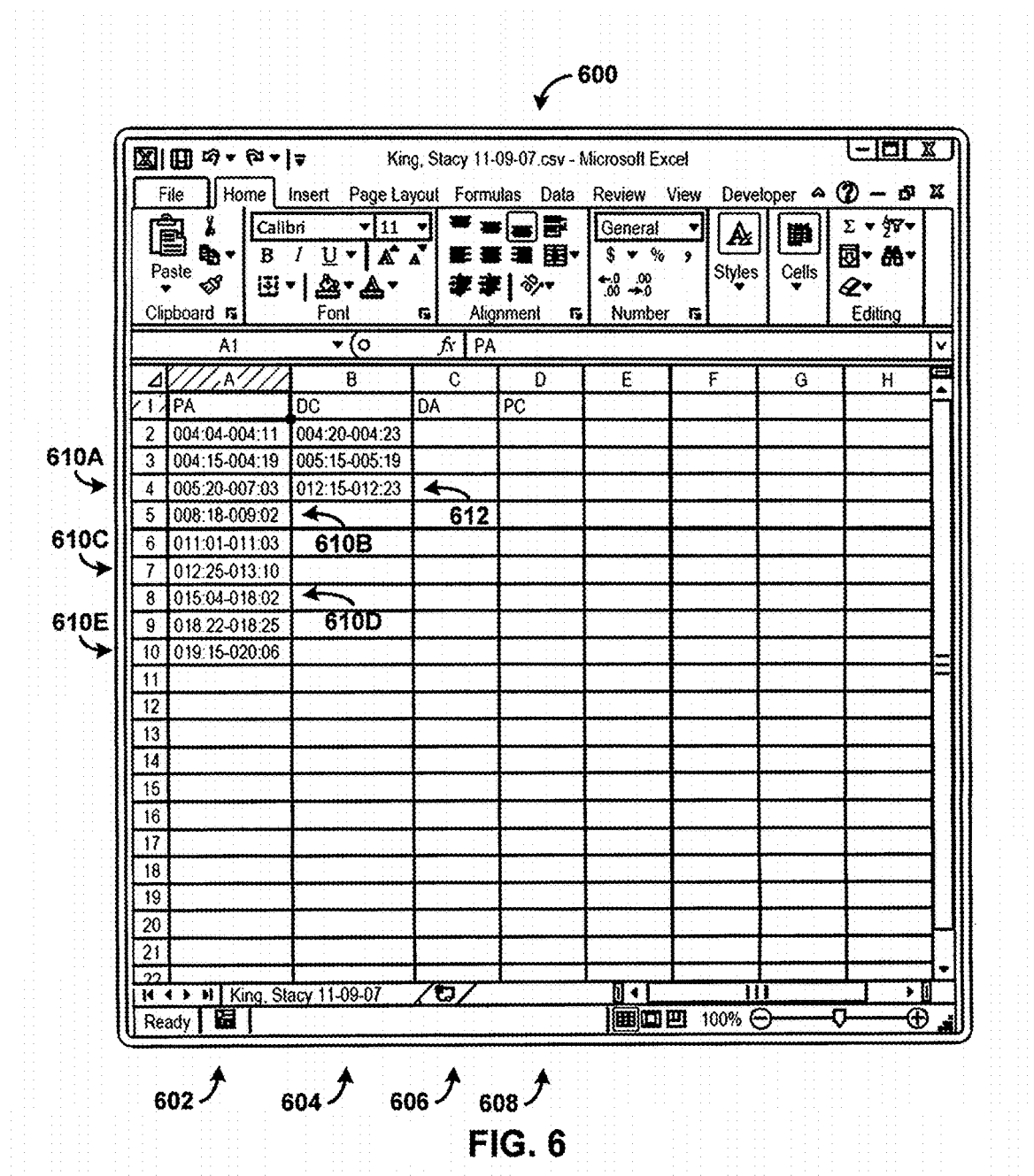

FIG. 6 illustrates a CSV file 600 containing two sets of processed designations of contents of the textual transcript having quarantined errors removed therefrom in accordance with the present disclosure. The CSV file 600 may be displayable as a spreadsheet having columns for plaintiff affirmatives 602, defendant counters 604, defendant affirmatives, 606, and plaintiff counters 608, as well as custom fields. The CSV file 600 may be automatically stored in a non-transitory computer-readable medium and automatically assigned a name according to a naming convention that indicates the textual transcript to which it relates. Alternatively or additionally, a memory location, such as a folder, may be automatically selected to indicate the textual transcript to which it relates. In addition to being free of errors, the processed designations may include new designations 610A-610E that were created to replace adjacent designations, and a new designation 612 created to replace overlapping designations, as described above.

Figure 7:
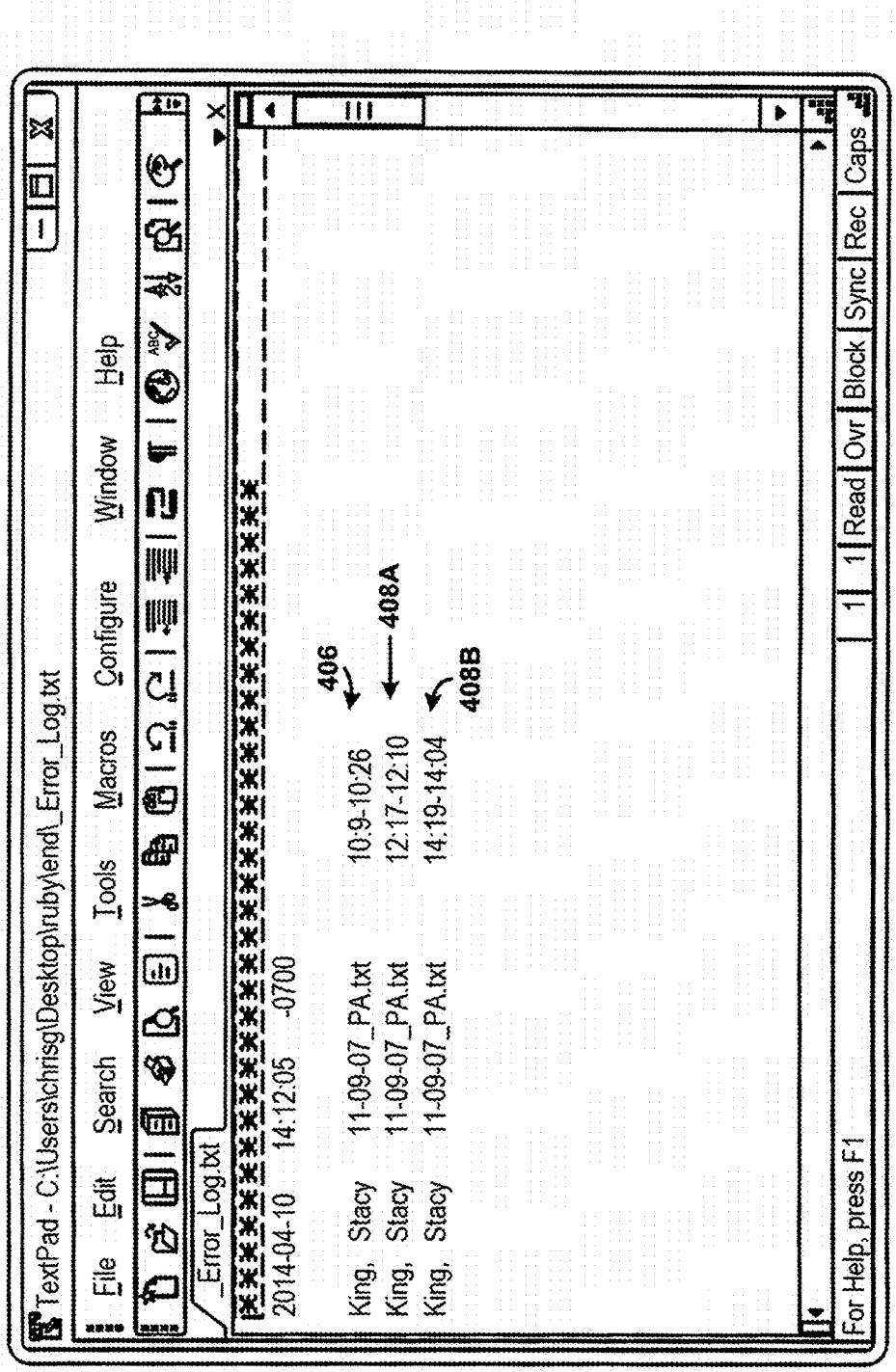
FIG. 7 illustrates a computer-generated quarantine report identifying the quarantined errors in accordance with the present disclosure.

FIG. 7 illustrates a quarantine report 700 identifying the quarantined errors in accordance with the present disclosure. For example, invalid designations 406, 408A, and 408B may be included in the quarantine report. The quarantine report 700 may be automatically stored in a non-transitory computer-readable medium and automatically assigned a name according to a naming convention that indicates the textual transcript to which it relates. Alternatively or additionally, a memory location, such as a folder, may be automatically selected to indicate the textual transcript to which it relates. It is envisioned that the quarantine report 700 may be displayed, printed, or otherwise rendered in accordance with user selections.

Figure 8:
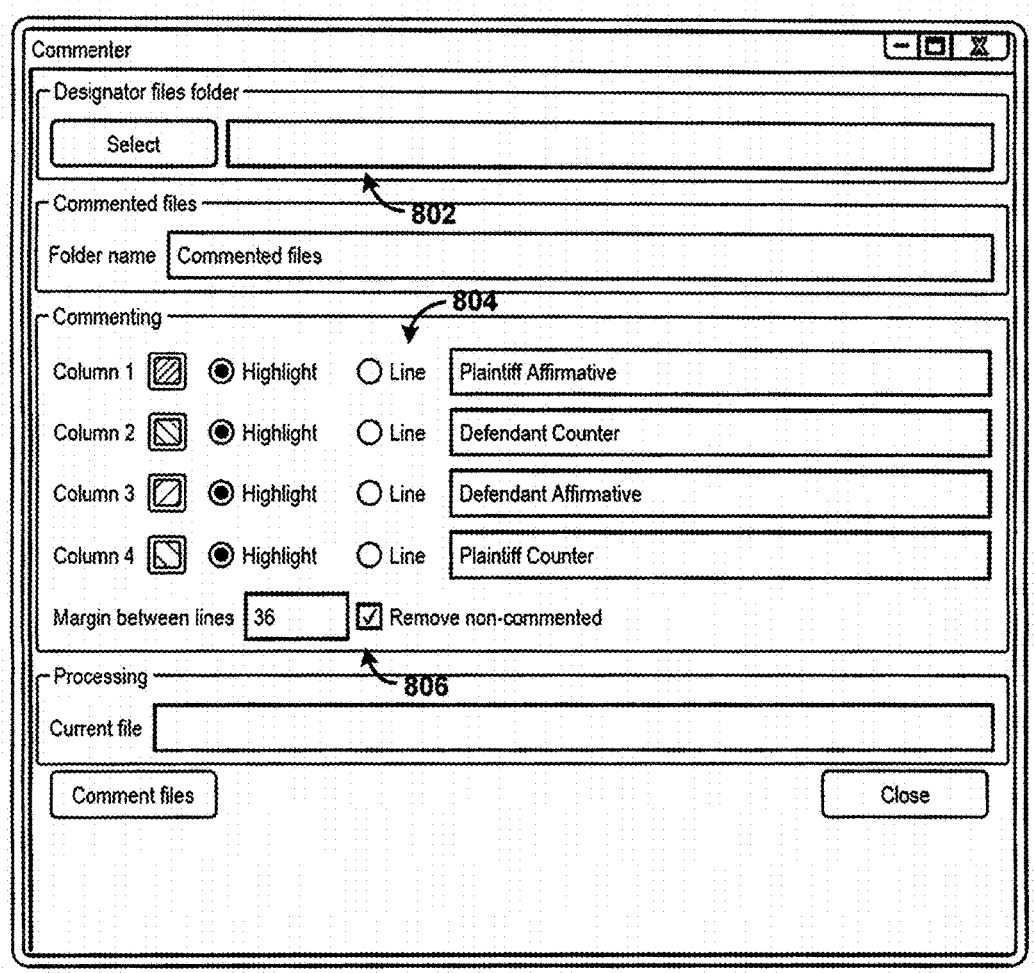
FIG. 8 illustrates a computer-implemented graphical user interface adapted to receive user selections for generating a processed and marked up textual transcript in accordance with the present disclosure.

FIG. 8 illustrates a graphical user interface 800 adapted to receive user selections for generating a processed textual transcript in accordance with the present disclosure. For example, a folder selection control 802 may be provided whereby a user may select a folder, stored on a non-transitory computer-readable medium, of files to be processed. Also, a set of markup controls 804 may be provided that permit a user to select a hue of highlight or line for use in marking, by the one or more computer processors, contents of the textual transcript corresponding to two or more pre-defined categories, such as a plaintiff affirmative category, a defense counter category, a defense affirmative category, a plaintiff counter category, and/or custom user categories. It is envisioned that text boxes may be provided for the user to specify the categories to be used with each hue, and that radio buttons may be provided to allow the user to select a highlight type of markup or a line type of markup for each category. Additional controls 806, such as a checkbox and drop down menu, may be provided to allow the user to select to remove non-designated text, and to select a margin to be employed between lines.

FIG. 9 illustrates a processed textual transcript 900 in accordance with the present disclosure. The one or more computers may access the selected folder and determine, according to a naming convention, which processed designations relate to which textual transcripts within the folder. It is envisioned that batch processing of multiple transcripts may be carried out in this fashion. The one or more computers may create a processed textual transcript according to the user selections by, for example, marking up text of the first category, as at 902A and 902B, so as to be distinguishable from text of the second category, as at 904. Additional details regarding generating a processed textual transcript are provided below with reference to FIG. 10.

Figure 10:
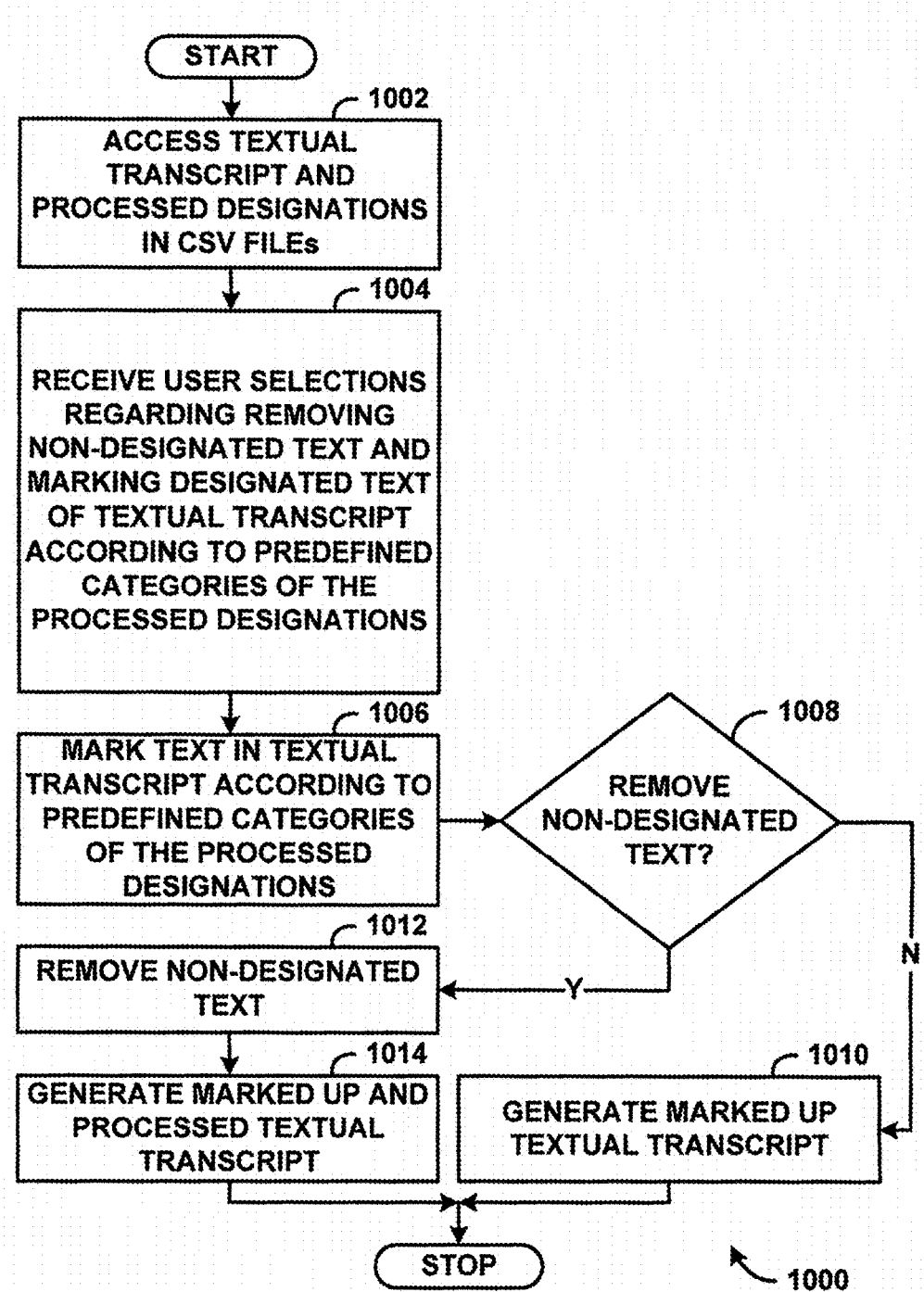
FIG. 10 illustrates a computer-implemented method for generating a processed and marked-up textual transcript in accordance with the present disclosure.

FIG. 10 illustrates a computer-implemented method 1000 for generating a processed and marked up textual transcript in accordance with the present disclosure. Beginning at block 1002, one or more computer processors may access one or more electronic files containing the processed designations, such as a CSV file, and a corresponding textual transcript. For example, the one or more computer processors may receive one or more of the one or more electronic files over an interface or communication link. Alternatively or additionally, the one or more computer processors may access one or more non-transitory computer-readable media storing one or more of the one or more files. It is envisioned that a user interface may receive a selection of an electronic folder from a user, as described above, and thereby access a folder containing the one or more electronic files. Alternatively or additionally, it is envisioned that the computer may access the electronic files based on a file naming methodology utilized to indicate that the files relate to one another. Accordingly, it is envisioned that a user may designate a folder containing multiple sets of processed designations and textual transcripts, and perform batch processing using the file naming methodology to determine which processed designations and textual transcripts relate to one another. Processing may proceed from block 1002 to block 1004.

At block 1004, the one or more computer processors may receive user selections regarding removing non-designated text and marking designated text of a textual transcript according to predefined categories of processed designations. For example, the user interface of FIG. 8 may provide the controls described above, and the selections may be received by the controls. It is also envisioned that a command line user interface may be employed instead of, or in addition to, a graphical user interface. Processing may proceed from block 1004 to block 1006.

At block 1006, the one or more computer processors may markup text of the textual transcript according to the user selections, as described above. For example, a hue of markup for a first category of text may be applied as a highlight, as an underline, as a text color, or as a line in a margin, as selected by the user. Additionally, a hue of markup for a second category of text may be applied as a highlight, as an underline, as a text color, or as a line in a margin, as selected by the user. Also, a hue of markup for a third category of text may be applied as a highlight, as an underline, as a text color, or as a line in a margin, as selected by the user. Further, a hue of markup for a fourth category of text may be applied as a highlight, as an underline, as a text color, or as a line in a margin, as selected by the user. It is envisioned that additional categories of text may be marked up. Once all of the categories of text that have been selected by the user to be marked up have been processed, processing may proceed from block 1006 to block 1008.

At block 1008, a determination may be made whether the user selected to remove non-designated text. If it is determined, at block 1008, that the user selected to remove non-designated text, then processing may proceed from block 1008 to block 1010. However, if it is determined, at block 1008, that the user selected not to remove non-designated text, then processing may proceed to block 1012.

At block 1010, the one or more computer processors may generate the marked up textual transcript. Generating the marked up textual transcript at block 1010 may include recording the marked up transcript in a computer-readable medium, and automatically assigning a name according to a naming convention that indicates the processed designations and/or, textual transcript to which it relates. Alternatively or additionally, a memory location, such as a folder, may be automatically selected to indicate the processed designations and/or textual transcript to which it relates. It is envisioned, for example, that the marked up textual transcript may be saved in a portable document format (PDF). Alternatively or additionally, generating the marked up textual transcript at block 1010 may include printing the marked up textual transcript, generating an electronic display of the marked up textual transcript, or otherwise rendering the marked up textual transcript.

At block 1012, the one or more computer processors may create a new textual transcript containing only marked-up text designated by the processed designations, and employ margins between lines as specified by the user. Alternatively, line margin options may allow the user to set a distance of line annotation from a side of the text, rather than a space between lines of text on a page. Once all designated text has been copied to the new textual transcript, the new textual transcript may be designated for further processing, and processing may proceed from block 1012 to block 1014.

At block 1014, the one or more computer processors may generate the marked up and processed textual transcript. Generating the marked up and processed textual transcript at block 1014 may include recording the new textual transcript in a computer-readable medium, and automatically assigning a name according to a naming convention that indicates the processed designations and/or, textual transcript to which it relates. Alternatively or additionally, a memory location, such as a folder, may be automatically selected to indicate the processed designations and/or textual transcript to which it relates. It is envisioned, for example, that the marked up and processed textual transcript may be saved in a portable document format (PDF). Alternatively or additionally, generating the marked up and processed textual transcript at block 1014 may include printing the marked up and processed textual transcript, generating an electronic display of the marked up and processed textual transcript, or otherwise rendering the marked up and processed textual transcript.

Figure 11:
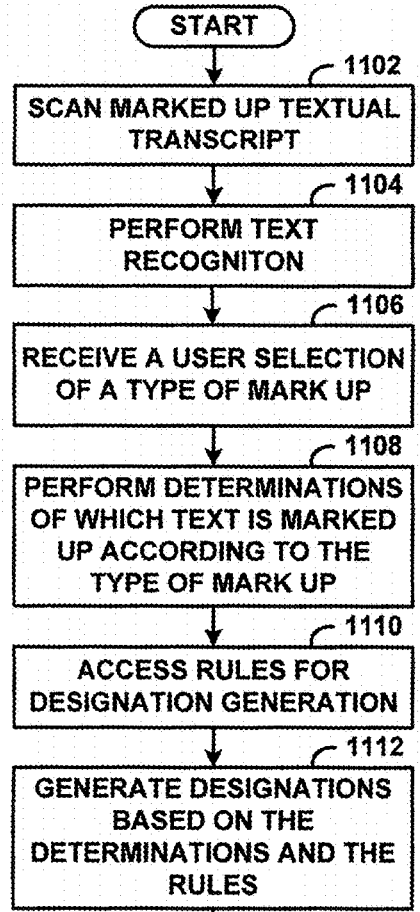
FIG. 11 illustrates a computer-implemented method for generating designations from a scan of a marked up textual transcript in accordance with the present disclosure.
Figure 12:
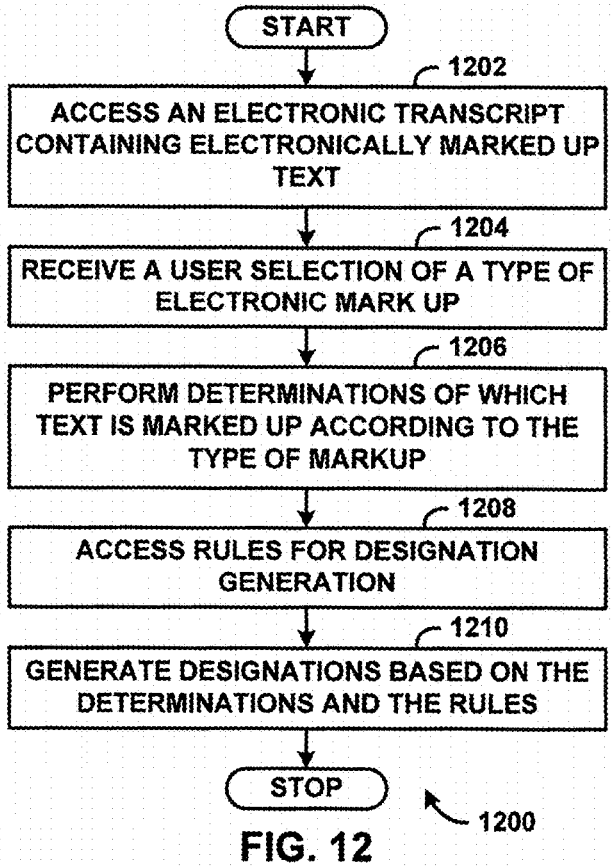
FIG. 12 illustrates a computer-implemented method for generating designations from an electronic transcript containing electronically marked up text in accordance with the present disclosure.
Figure 13:
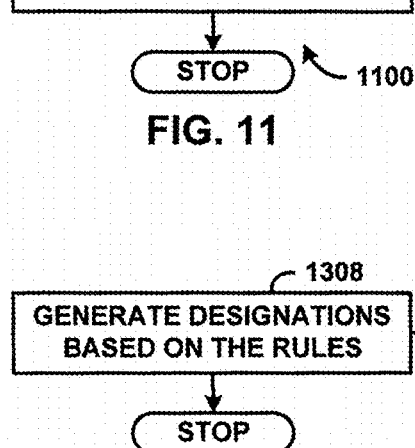
FIG. 13 illustrates a computer-implemented method for generating designations from recordings of spoken designations in accordance with the present disclosure.

FIGS. 11-13 illustrate computer-implemented methods 1100, 1200, and 1300 in which one or more computer processors generating designations for a deposition testimony transcript. These processes carry out procedures that include accessing, by the one or more computer processors, designation information regarding designations made with respect to text of a deposition testimony transcript. These processes additionally carry out procedures that include accessing, by the one or more computer processors, rules for generating designations based on the designation information. These processes also carry out procedures that include generating, by the one or more computer processors, the designations based on the rules. These processes are individually described in further detail below with reference to FIGS. 11-13.

FIG. 11 illustrates a computer-implemented method 1100 for generating designations from a scan of a marked up textual transcript in accordance with the present disclosure. Beginning at block 1102, one or more computer processors may scan a marked up textual transcript into computer memory. For example, a PDF may be generated by scanning a textual transcript having highlighted, underlined, and/or otherwise marked up text. It is envisioned that the marked up textual transcript may have been manually marked up by an attorney. Alternatively, it is envisioned that the marked up textual transcript may have been generated by method 1000 (see FIG. 10) and printed. Processing may proceed from block 1102 to block 1104.

At block 1104, the one or more computer processors may perform text recognition of at least marked up text of the textual transcript. Processing may proceed from block 1104 to block 1106.

At block 1106, the one or more computer processors may receive, via a user interface, a user selection of a type of mark up, such as highlighted text, underlined text, or otherwise marked up text. For example, it is envisioned that the user may be able to specify a hue of highlight or color of underline to aid in detection of highlighted text. Processing may proceed from block 1106 to block 1108.

At block 1108, the one or more computer processors may perform determinations regarding which text of the textual transcript is marked up, and these determinations may be performed according to the type of markup selected by the user. For example, if the user selected highlighted text, then other types of markup may be ignored. Additionally, if the user specified a color of highlight, then the highlighted text may be identified by detecting the color of the region of the page of the PDF in which the text is located. Processing may proceed from block 1108 to block 1100.

At block 1110, the one or more computer processors access rules for designation generation. For example, the rules may specify a format for listing the designations, and this format may be uniform. Processing may proceed from block 1110 to block 1112.

At block 1112, the one or more computer processors may generate designations based on the determinations and the rules. For example, a text file may be created that lists the designations and this text file may be given a name according to a naming convention specified in the rules accessed at block 1110. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 11 may be performed on a batch level.

FIG. 12 illustrates a computer-implemented method 1200 for generating designations from an electronic transcript containing electronically marked up text in accordance with the present disclosure. Beginning at block 1202, one or more computer processors may access an electronic version of a deposition testimony transcript containing electronically marked up text. For example, it is envisioned that an attorney may electronically highlight text in the electronic version of the transcript and save the electronically highlighted document to a non-transitory computer-readable medium. Block 1202 may, thus, involve the one or more computer processors accessing the stored electronic version of the transcript in the non-transitory computer-readable medium. Alternatively, block 1202 may involve access a stored processed and marked up textual transcript created by method 1000 (see FIG. 10). Processing may proceed from block 1202 to block 1204.

At block 1204, the one or more computer processors may receive, via a user interface, a user selection of a type of mark up, such as highlighted text, underlined text, or otherwise marked up text. For example, it is envisioned that the user may be able to specify a hue of highlight or color of underline to aid in detection of highlighted text. Processing may proceed from block 1204 to block 1206.

At block 1206, the one or more computer processors may perform determinations regarding which text of the textual transcript is marked up, and these determinations may be performed according to the type of markup selected by the user. For example, if the user selected highlighted text, then other types of markup may be ignored. Additionally, if the user specified a color of highlight, then the highlighted text may be identified by detecting the color of the highlight applied to the text. Processing may proceed from block 1206 to block 1208.

At block 1208, the one or more computer processors access rules for designation generation. For example, the rules may specify a format for listing the designations, and this format may be uniform. Processing may proceed from block 1208 to block 1210.

At block 1210, the one or more computer processors may generate designations based on the determinations and the rules. For example, a text file may be created that lists the designations and this text file may be given a name according to a naming convention specified in the rules accessed at block 1208. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 12 may be performed on a batch level.

FIG. 13 illustrates a computer-implemented method for generating designations from recordings of spoken designations in accordance with the present disclosure. Beginning at block 1302, one or more computer processors may access recordings of spoken designations. For example, it is envisioned that an attorney may dictate designations into a recorder and store a sound file in a non-transitory computer-readable medium. Thus, block 1302 may involve accessing the stored sound file. Processing may proceed from block 1302 to block 1304.

At block 1304, the one or more computer processors may perform speech to text with respect to the spoken designations. Processing may proceed from block 1304 to block 1306.

At block 1306, the one or more computer processors may access rules for generating designations based on generated text. For example, the rules may specify a format for listing the designations, and this format may be uniform. Processing may proceed from block 1306 to block 1308.

At block 1308, the one or more computer processors may generate designations based on the rules. For example, a text file may be created that lists the designations and this text file may be given a name according to a naming convention specified in the rules accessed at block 1306. It is also envisioned that a user input, received via the user interface, may provide a category for the designations, such as plaintiff affirmative, defense counter, defense affirmative, defense counter, or a custom user category. This provided category may be used in naming the text file in accordance with the naming convention specified by the rules. It is envisioned that the procedures described with respect to FIG. 13 may be performed on a batch level.

Figure 14:
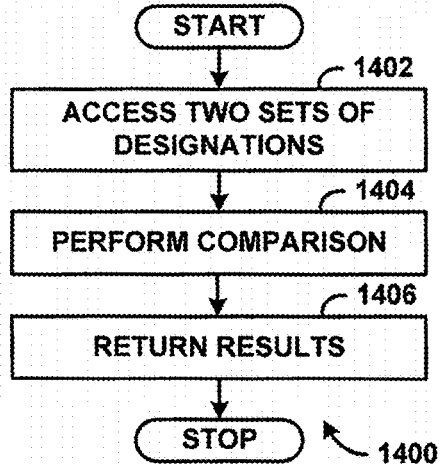
FIG. 14 illustrates a computer-implemented method for comparing two sets of designations in accordance with the present disclosure.

FIG. 14 illustrates a computer-implemented method 1400 for comparing two sets of designations in accordance with the present disclosure. Beginning at block 1402, one or more computer processors may access two sets of designations. For example, stored text files having the same name but different dates may be accessed, and these files may contain original and revised designations, respectively. Processing may proceed from block 1402 to block 1404.

At block 1404, the one or more computer processors may perform a comparison of the accessed text files. It is envisioned that a text file having an earlier date may be used as a base document for comparison. Processing may proceed from block 1404 to block 1406.

At block 1406, the one or more computer processors may return the results of the comparison, for example, as a new text file containing results of the comparison. If a video clip load file is present, it may return different results, based on the current clips. Alternatively or additionally, data representing the similarities and/or differences detected by the comparison may be input to another process, as will be described further below with respect to FIG. 16. It is envisioned that the procedures described with respect to FIG. 14 may be performed on a batch level.

Figure 15:
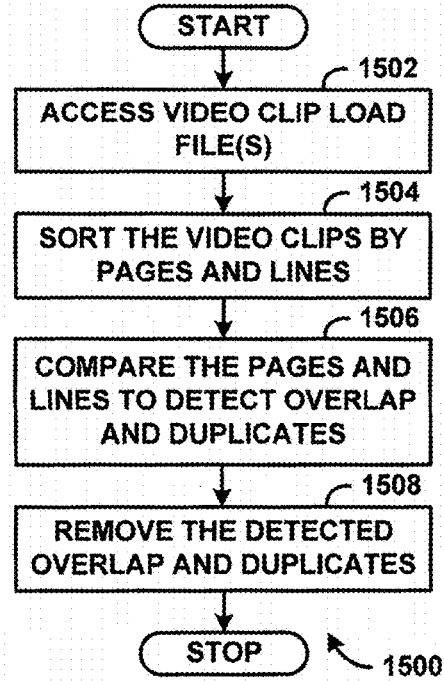
FIG. 15 illustrates a computer-implemented method for processing video clip load files in accordance with the present disclosure.

FIG. 15 illustrates a computer-implemented method 1500 for processing video clip load files in accordance with the present disclosure. Beginning at block 1502, one or more computer processors may access a video clip load file having page and line numbers. For example, a video clip load file or files stored in a non-transitory computer-readable medium may be accessed. Processing may proceed from block 1502 to block 1504.

At block 1504, the one or more computer processors may extract and sort the designations of the accessed video clip load file in order by the page and line numbers. Processing may proceed from block 1504 to block 1506.

At block 1506, the one or more computer processors may compare the pages and lines of the video clips to detect overlap between the video clips and/or duplicate video clips. This process may be identical to that described above with respect to FIG. 5. Processing may proceed from block 1506 to block 1508.

At block 1508, the one or more computer processors may remove detected overlap and/or duplicates. This process may also be similar to that described above with respect to FIG. 5, and may employ similar logic applied to video clips instead of designations. It is envisioned that the procedures described with respect to FIG. 15 may be performed on a batch level.

Figure 16:
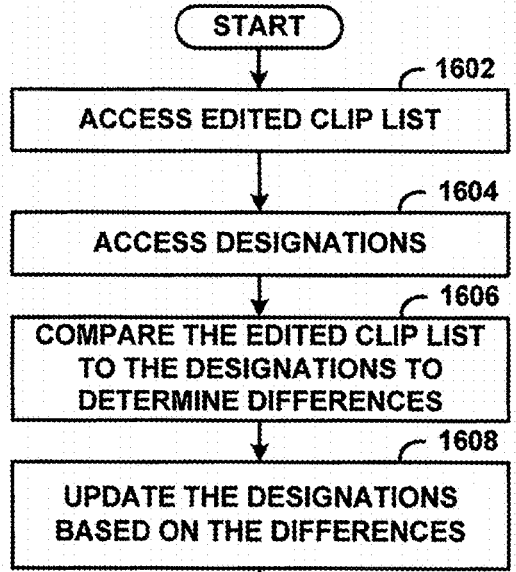
FIG. 16 illustrates a computer-implemented method for updating designations based on an edited video clip list in accordance with the present disclosure.

FIG. 16 illustrates a computer-implemented method 1600 for updating designations based on an edited video clip list in accordance with the present disclosure. Beginning at block 1602, one or more computer processors may access an edited video clip list. For example, it is envisioned that an edited video clip list may be exported from a video editing program that uses designations to edit video. This video clip list may be stored in a non-transitory computer-readable medium, and block 1602 may include accessing the stored video clip list. Processing may proceed from block 1602 to block 1604.

At block 1604, the one or more computer processors may access the designations for the video testimony transcript. It is envisioned that the designations may be accessed as one or more stored text files or stored CSV file containing sets of designations that were employed by the video editing program to edit video and thereby generate a video that was edited to produce the accessed edited video clip list. Processing may proceed from block 1604 to block 1606.

At block 1606, the one or more computer processors may compare the edited clip list to the designations to determine differences. This process may include accessing rules for converting the edited clip list to a designation format for comparison to the designations and converting the edited clip list to the designation format according to the rules. Comparing the accessed designations to the designations generated by the conversion of the edited clip list may then be performed, for example, as described above with reference to FIG. 14. Processing may proceed from block 1606 to block 1608.

At block 1608, the one or more computer processors may update the designations based on the determined differences. For example, data regarding the differences may be processed to add, remove, and/or combine designations. As described above with respect to FIG. 5, user selections may govern whether the one or more computer processors remove overlap or combine adjacent designations. It is envisioned that the procedures described with respect to FIG. 16 may be performed on a batch level.

It is appreciated that the above example cases may be implemented separately or in combination. Additionally, it is noted that one or more steps in the example flow processes of FIGS. 5 and 10-16 may be implemented in a differing order or omitted all together. For example, in FIG. 5 the removing overlap and combining adjacent designation steps may be omitted, switched in order, or implemented before or after quarantining errors. Additionally, in FIG. 10 the transcript marking step may be implemented before removing non-designated text. Accordingly, one of skill in the art would understand that these and other steps may be implemented in various orders in some embodiments.

Figure 17:
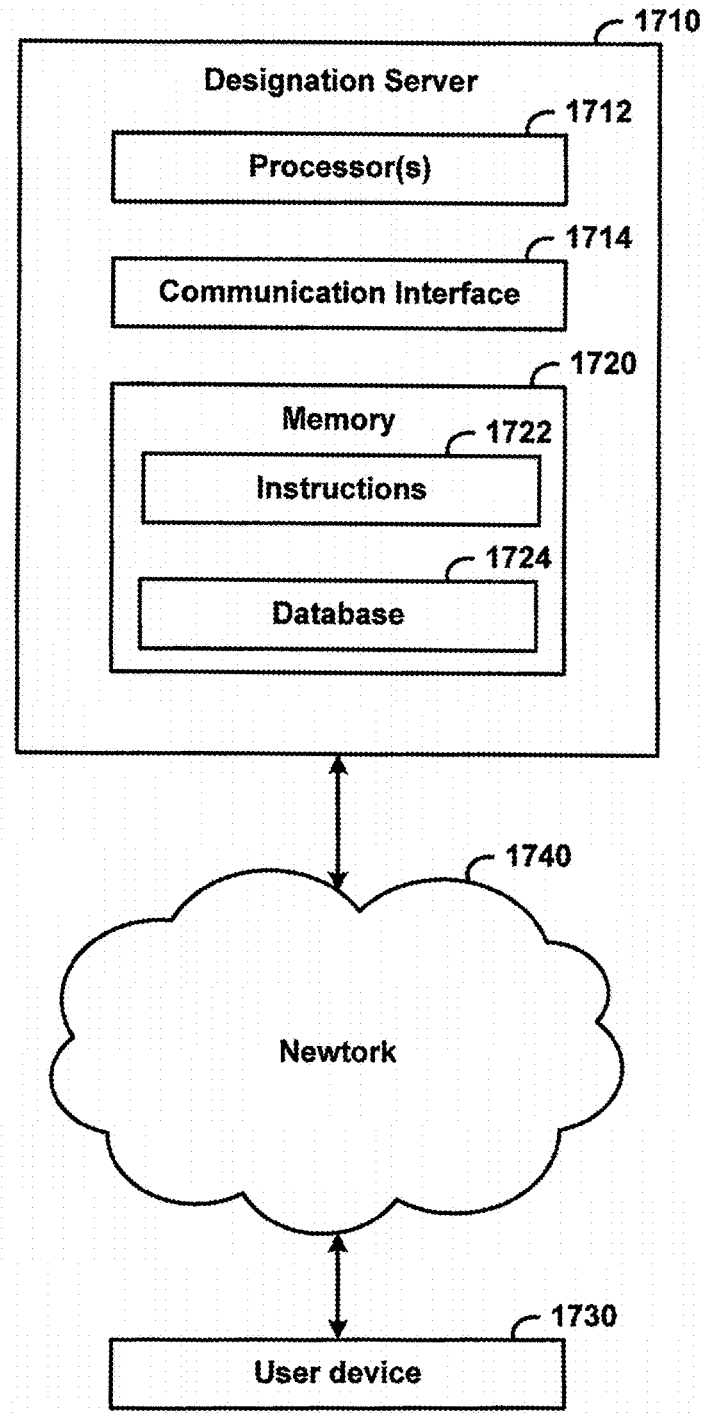
FIG. 17 is a block diagram illustrating an exemplary embodiment of a system for generating designations and marked-up textual transcripts in accordance with the present disclosure.

FIG. 17 is a block diagram illustrating an exemplary embodiment of a system for generating designations and marked-up textual transcripts in accordance with the present disclosure. As shown in FIG. 17, the system may include a designation server 1710 that includes a processor 1712, a communication interface 1714, and a memory 1720. In an embodiment, the processor 1712 may include one or more processors, and each of the one or more processors may include one or more processing cores.

The communication interface 1714 may communicatively couple the designation server 1710 to a user device 1730 via a network 1740. In an embodiment, the communication interface 1714 may be configured to communicatively couple the designation server 1710 to the network 1740 via a wired or wireless connection established according to one or more communication protocols or standards (e.g., an Ethernet protocol, a transmission control protocol/interne protocol (TCP/IP), an institute of electrical and electronics engineers (IEEE) 802.11 protocol, and an IEEE 802.16 protocol, a 3rd Generation (3G) protocol, a 4th Generation (4G)/long term evolution (LTE) protocol, etc.).

The network 1740 may be a wired network, a wireless network, or may include a combination of wired and wireless networks. For example, the network 1740 may be a local area network (LAN), a wide area network (WAN), a wireless WAN, a wireless LAN (WLAN), a metropolitan area network (MAN), a wireless MAN network, a cellular data network, a cellular voice network, the interne, etc. Additionally, the network 1740 may include multiple networks operated by different entities. The user device 1730 may communicate with the designation server 1710 via the connection to the network 1740 to perform designation operations (e.g., the designation operations described above with respect to FIGS. 1-16, and the additional designation operations described and illustrated below with reference to FIGS. 17-23).

The memory 1720 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 1720 may store instructions 1722 and a database 1724. The instructions 1722 may include instructions that, when executed by the processor 1712, cause the processor 1712 to perform operations for presenting various graphical user interfaces (GUIs) that provide designation functionality to a user, as described in more detail below. In an embodiment, the GUIs may include one or more web pages that enable a user to create designation projects, upload transcripts, video files, and other information, create, modify, and view designations, manage designation projects, and other features and functionality, as described in more detail below with reference to FIGS. 18A-23. The database 1724 may store various files and information related to designations (e.g., transcript and/or video designations). It is noted that while the database 1724 is shown as being stored at the memory 1720 of the designation server 1710, in embodiment, the database 1724 may be stored external to the designation server 1710. For example, the database 1724 may be stored at a memory device (not shown in FIG. 17), such as a network attached storage device, that is accessible to the designation server 1710 via the network 1740 using the communication interface 1714. Additionally, it is noted that in an embodiment, the database 1724 may be a distributed database stored across a plurality of storage devices that may be geographically distributed or that may be centrally located. For example, the database 1724 may be stored in a storage area network (SAN).

The user device 1730 may be a device that is utilized by a user to interact with the designation server 1710 to perform operations in connection with generating designations with respect to one or more deposition testimony transcripts. In an embodiment, the user device 1730 may be a laptop computing device, a personal computing device, a tablet computing device, a smartphone, a personal digital assistant (PDA), or another electronic device configured to perform the operations of the user device 1730.

A user may utilize the user device 1730 to interact with the designation server 1710. For example, the user may provide inputs to the user device 1730 to establish a connection between the user device 1730 and the designation server 1710. In an embodiment, the inputs to establish the connection may include the user navigating a web browser provided by the user device 1730 to a web page provided by the designation server 1710. The web page may be configured to provide functionality for performing operations for performing designations with respect to deposition testimony transcripts, as described in more detail below. In an additional or alternative embodiment, the inputs to establish the connection may be provided to an application executing on the user device 1730, where the application is configured to communicate with the designation server 1710 to provide functionality for performing operations for performing designations with respect to deposition testimony transcripts, as described in more detail below. In another additional or alternative embodiment, the functionality for providing operations for performing designations with respect to deposition testimony transcripts may be provided by the designation server 1710 via a cloud-based platform that is accessible to the user device 1730 via the network 1740.

Figure 18A:
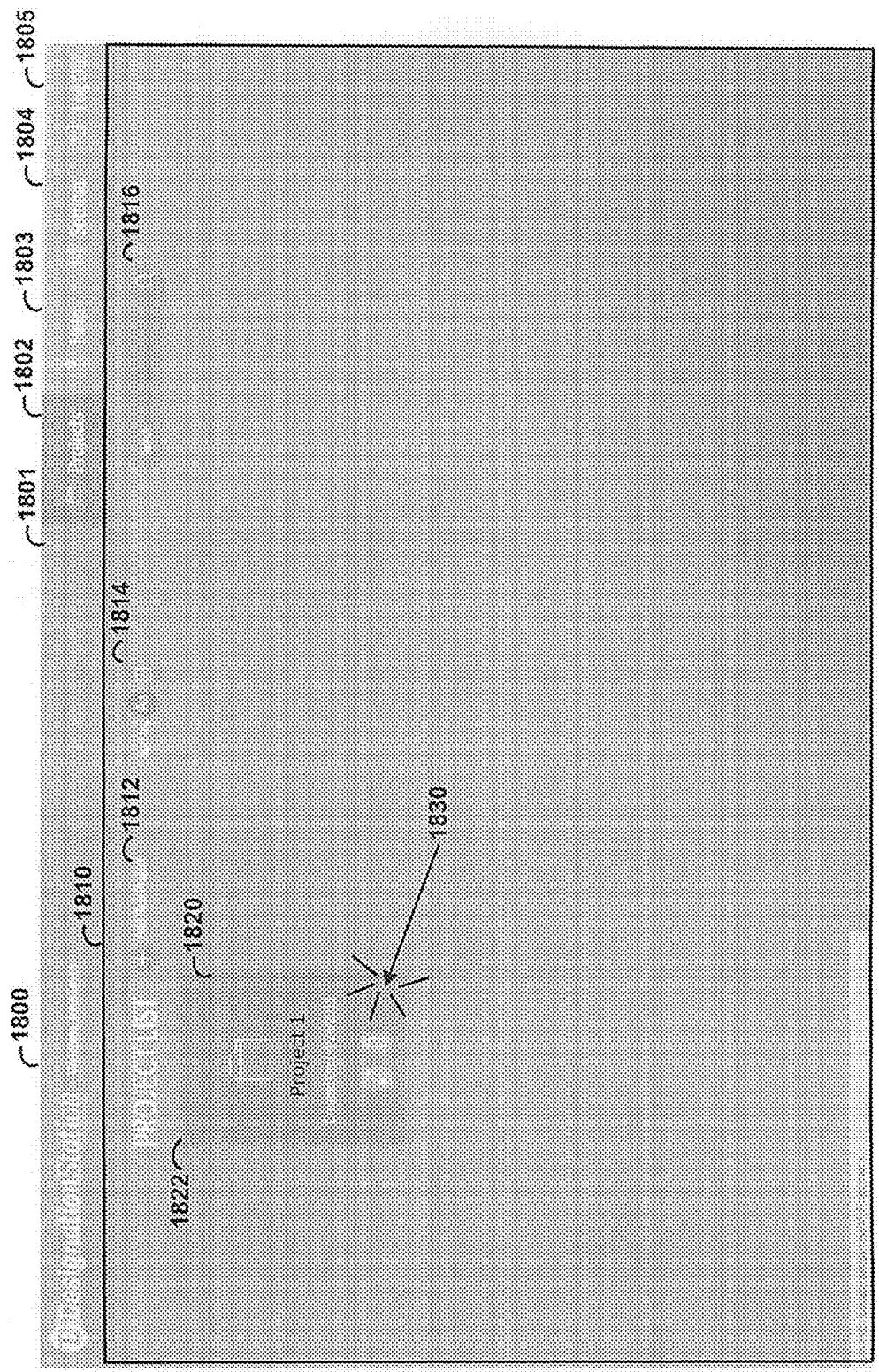
FIG. 18A is a diagram of an exemplary embodiment of a GUI for creating, modifying, and managing designation projects.

During operation, a graphical user interface (GUI) (e.g., one or more of the GUIs described with reference to FIGS. 18A-18I and 19A-21) may be presented at the user device 1730, and may be used to generate outputs with respect to deposition testimony transcript designations (e.g., the outputs described with reference to FIGS. 18J, 18K, 22A, and 22B). In an embodiment, the GUI may be presented in the web browser executing on the user device 1730. In an additional or alternative embodiment, the GUI may be presented via the application executing on the user device 1730. The GUI may be configured to provide functionality that enables the user to create, modify, and manage designation projects with respect to deposition testimony transcripts of one or more deponents, as described in more detail below. For example, and referring to FIG. 18A, an exemplary embodiment of a GUI for creating, modifying, and managing designation projects is shown, as a GUI 1800. As shown in FIG. 18A, the GUI 1800 includes a plurality of tabs/controls and a display area 1810. The plurality of tabs includes a projects tab 1801, a help tab 1802, a designation project settings tab 1803, a logout control 1804, and a users tab 1805. Selection of the project tab 1801 may cause the display area 1810 to be populated with project management controls, such as an add new project control 1812, a sort control 1814, and a search control 1816. Selection of the add new project control 1812 may enable the user to create a new designation project. In an embodiment, selection of the add new project control 1812 may initiate presentation of one or more additional GUI elements to facilitate the creation of a new designation project. Such additional GUI elements may include elements to provide a name for the new designation project and other information associated with the designation project (e.g,. a name of the litigation or related matter associated with the designation project, a matter number or numbers used by the user and other parties to identify the designation project, etc.). The sort control 1814 may enable the user to sort designation projects alphabetically, by date, or another criteria, and the search control 1816 may enable the user to search for a particular designation project, such as by name, date, or other search criteria.

Additionally, upon selection of the projects tab 1801, the display area 1810 may be populated with one or more designation projects, such as the designation project 1820. As shown in FIG. 18A, designation projects, such as the designation project 1820, may include a pin control 1822 that, when selected, maintains the corresponding project such that the project is listed at the top of the display area 1810 (or near the top depending on the number of designation projects for which the pin control has been selected). Selection of a designation project may initiate an update of the GUI 1800 to display information associated with the selected designation project. For example, selection of the designation project 1820, as indicated by the arrow 1830, may initiate an update of the GUI 1800 to display information associated with the designation project 1820.

Figure 18B:
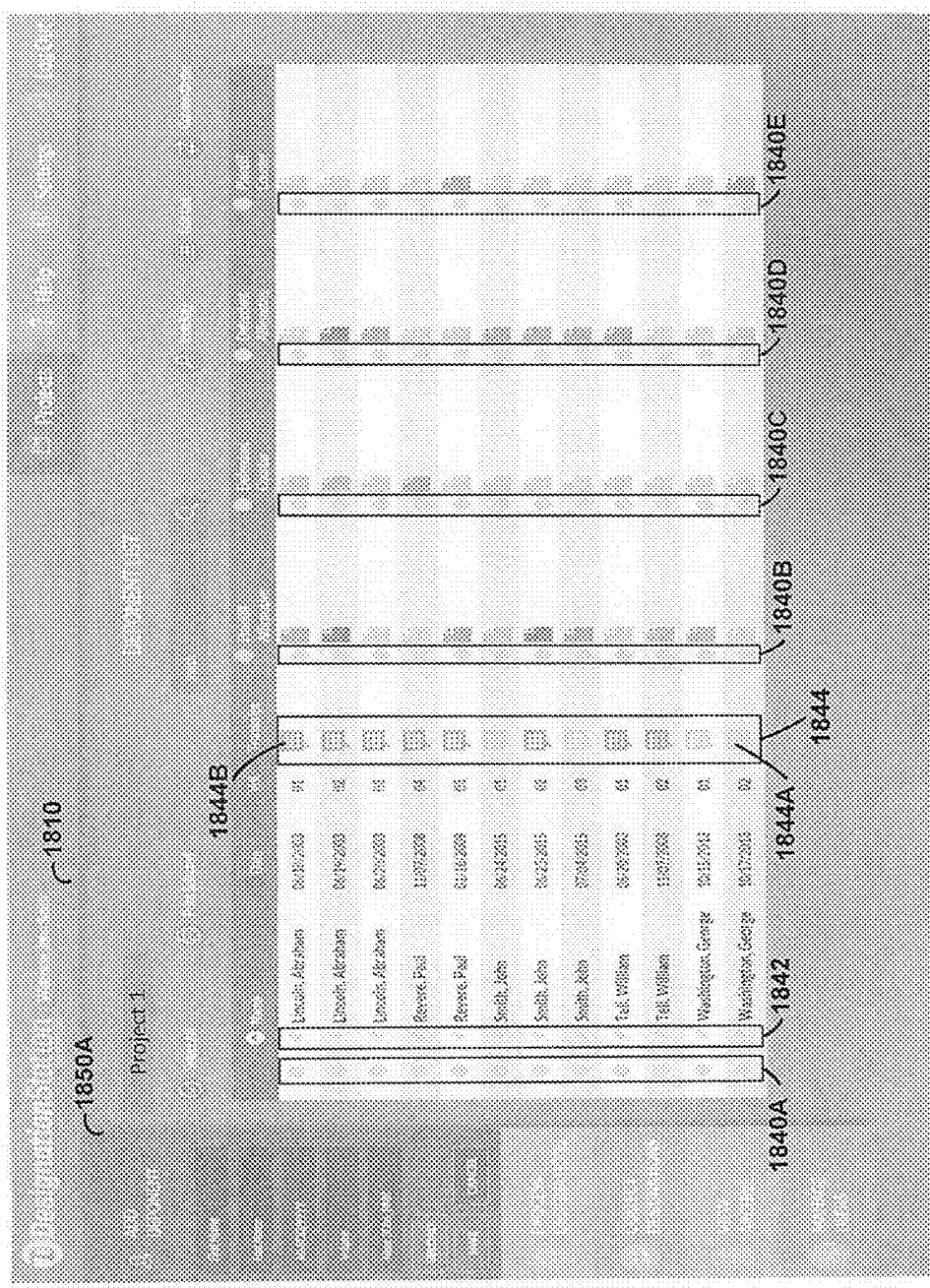
FIG. 18B is a diagram of an exemplary embodiment of a GUI illustrating information that may be presented in connection with a designation project.
Figure 18C:
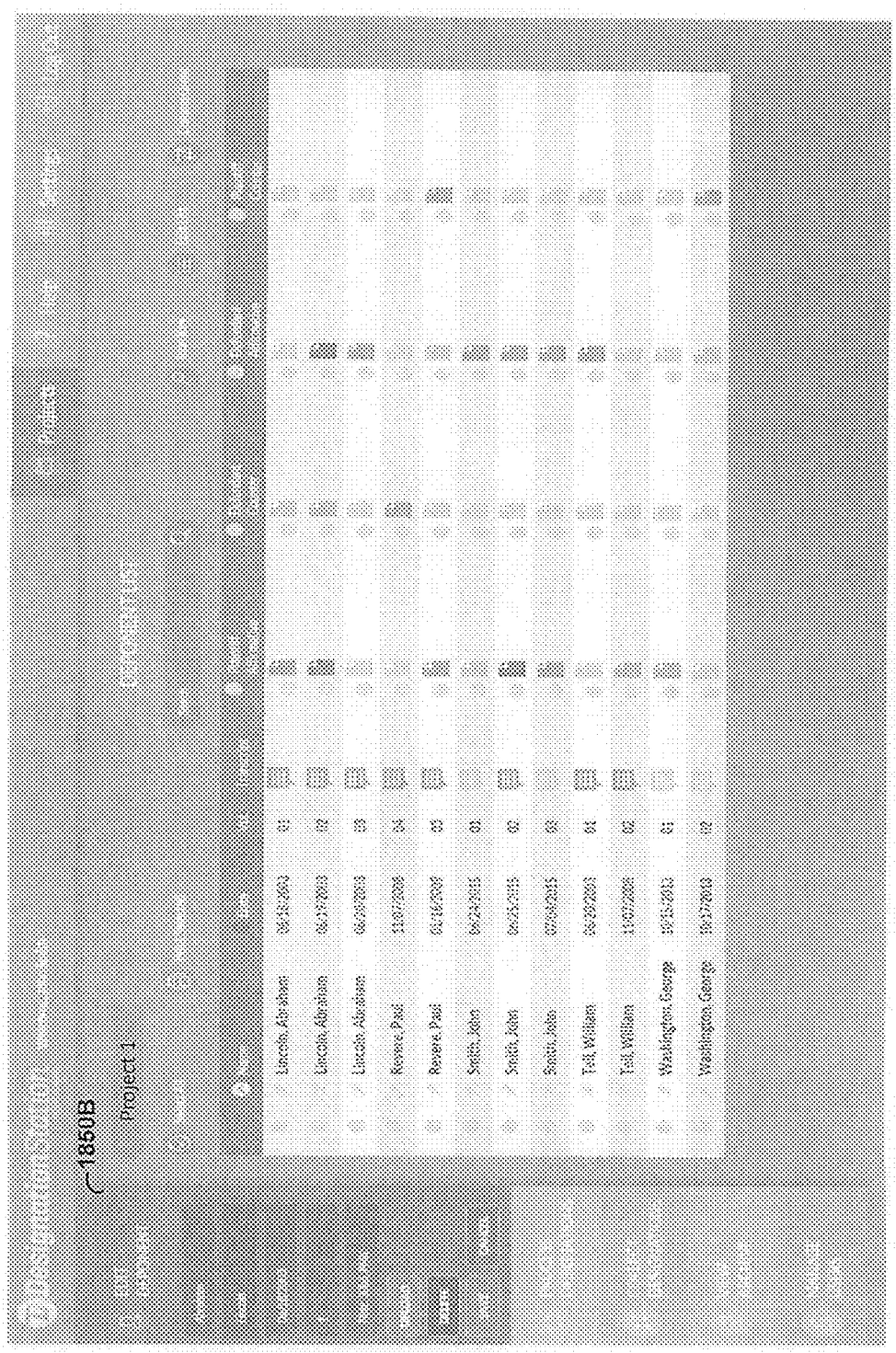
FIG. 18C is a diagram of an exemplary edit deponent interface for editing deponent information.

Referring to FIG. 18B, an exemplary embodiment of a GUI illustrating information that may be presented in connection with a designation project is shown. In an embodiment, the information presented in the display area 1810 of FIG. 18B may be presented in response to updating the GUI 1800 upon selection of the designation project 1820. As shown in FIG. 18B, information presented in connection with a designation project may include a table, where rows of the table identify deponents and dates upon which the various deponents were deposed. As shown in FIG. 18B, columns of the table identify categories of information associated with the various deponents and deposition testimony transcripts. For example, the columns include a name column (e.g., a name of the deponent), a date column (indicating a date the deposition testimony of the deponent was given), a volume column (e.g., a volume of the deposition testimony transcript), a transcript uploaded column (including an icon indicting whether the deposition testimony transcript for a particular row of the table has been uploaded), a plaintiff affirmative designations column, a defendant counter designations column, a defendant affirmative designations column, and a plaintiff counter designations column. Radio buttons 1840A may be used to select particular rows of the table for which actions are to be taken (e.g., process designations, etc.), as described in more detail below. In addition to the radio buttons 1840A, radio buttons 1840B, 1840C, 1840D, and 1840E are provided for selecting particular designations. For example, the radio buttons 1840B may be used to select particular deposition testimony transcripts for which actions are to be taken with respect to plaintiff affirmative designations, the radio buttons 1840C may be used to select particular deposition testimony transcripts for which actions are to be taken with respect to defendant counter designations, the radio buttons 1840D may be used to select particular deposition testimony transcripts for which actions are to be taken with respect to defendant affirmative designations, and the radio buttons 1840E may be used to select particular deposition testimony transcripts for which actions are to be taken with respect to plaintiff counter designations.

As shown in FIG. 18B, designation icons may be presented adjacent to each of the radio buttons 1840B, 1840C, 1840D, and 1840E. The designation icons may be presented in various colors to identify the status of the corresponding designations. For example, when no designations have been provided, the designation icons may be presented in a first designation state (e.g., a first color, a first outline pattern, etc.). Once the designations have been provided, the designation icons may be presented in a second designation state (e.g., a second color, a second outline pattern, etc.). Once the designations have been processed, the designation icons may be presented in a third designation state (e.g., a third color, a third outline pattern, etc.), and if the designations were processed with errors, the designation icons may be presented in a fourth designation state (e.g., a fourth color, a fourth outline pattern, etc.). Thus, the designation icons adjacent to each of the radio buttons 1840B, 1840C, 1840D, and 1840E may quickly notify a user of the status of the various designations, such as which designations may need to be processed, which designations were processed with errors, etc.

When the user desires to add designations for a particular designation category (e.g., plaintiff affirmative designations, defendant counter designations, defendant affirmative designations, plaintiff counter designations), the user may double-click or otherwise select the icon, and, in response to the selection, the display area 1810 may be updated to present interfaces and controls for providing deposition testimony transcript designations, as described in more detail below with respect to FIGS. 19A-19E.

As shown in FIG. 18B, pin controls 1842 may be presented for each row, and may be used to pin a particular deponent/deposition testimony transcript to the top of the display area 1810. For example, when a pin control is selected for a particular row, that particular row may remain at the top of the display area 1810, and, as additional deponents and depositions are added to the designation project, such additional deponents and depositions may be inserted below the pinned deponents/depositions. By providing the pin controls 1842, the user may designate deponents/depositions of interest to remain on top of the deponents list for easier access during subsequent interactions with the GUI 1800.

As shown in FIG. 18B, deposition testimony transcript icons 1844 may be presented for each row. The deposition testimony transcript icons 1844 may indicate whether a deposition testimony transcript has been uploaded for a particular deponent. For example, a deposition testimony transcript icon may have a first state, indicated by the deposition testimony transcript icon 1844A, when a deposition testimony transcript has not been uploaded for a listed deponent, and may have a second state, indicated by the deposition testimony transcript icon 1844B, when a deposition testimony transcript has been uploaded for a listed deponent. In an embodiment, the first state of the deposition testimony transcript icon may have a first color, a first outline pattern, etc., and the second state of the deposition testimony transcript icon may have a second color, a second outline pattern, etc. In an embodiment, the deposition testimony transcript icon may be associated with a third state (e.g., an error state), and, in the third state, the deposition testimony transcript icon may have a third color, a third outline pattern, etc. to indicate that the deposition testimony transcript contains one or more errors or are otherwise problematic. Additionally, it is noted that additional states, colors, etc. may be associated with the deposition testimony transcript icons, and the examples of colors, states, etc. described herein are provided for purposes of illustration, rather than by way of limitation. By including the deposition testimony transcript icons 1844, and by changing the state of the deposition testimony transcript icons 1844 depending on whether a deposition testimony transcript has been uploaded and/or contains errors, the user may quickly identify deponents for which deposition testimony transcripts need to be uploaded, or that contain errors.

In an embodiment, when the user desires to upload a deposition testimony transcript, the user may double-click the deposition testimony transcript icon 1844 corresponding to the desired deponent/deposition, and, in response to the selection, the display area 1810 may be updated to present an add transcript interface. For example, and referring to FIG. 18I, an exemplary add transcript interface for uploading one or more deposition testimony transcripts is shown as an add transcript interface 1870. It is noted that interaction by the user with the add transcript interface 1870 may initiate presentation of additional interfaces, menus, dialogue boxes, etc. that may be provided to facilitate the uploading of the deposition testimony transcripts, and such additional interfaces, menus, dialogue boxes, etc. are not shown for simplicity of the present disclosure. Referring back to FIG. 18B, in an embodiment, the add deponent interface 1850A may include an upload control that may enable the user to perform bulk uploading of deposition testimony transcripts. For example, instead of typing name information and date information into the add deponent interface, the user may simply select the upload control, which may initiate presentation of additional interfaces, menus, dialogue boxes, etc. that may enable the user to select multiple deposition testimony transcripts (i.e., a bulk deposition testimony transcript upload). The bulk uploading of multiple deposition testimony transcripts may include uploading multiple deposition testimony transcripts for a single deponent, or may include uploading one or more deposition testimony transcripts for multiple deponents. In an embodiment, the system may be configured to automatically extract information (e.g., deponent name, volume, date, and other information) from the uploaded deposition testimony transcripts, and the extracted information may be used to populate entries (e.g., rows) of the interface illustrated in FIG. 18B.

Referring back to FIG. 18B, in addition to displaying the list of deponents/depositions in response to selection of a designation project, the display area 1810 may further be updated to present additional interface/tabs associated with other operations that may be performed with respect to the designation project. For example, as shown in FIG. 18B, an add deponent interface 1850A may be presented and used to add a deponent (e.g., a new deponent or a new deposition for an existing deponent) to the designation project. In an embodiment, the notes input may enable the user to enter notes regarding the deponent, which may be presented in various reports (e.g., as shown in FIG. 18J). Additionally or alternatively, the add deponent interface 1850A may be replaced by an edit deponent control. For example, and referring to FIG. 18C, an exemplary edit deponent interface for editing deponent information is shown as an edit deponent interface 1850B. It is noted that, in an embodiment, interaction with the add deponent interface 1850A and/or the edit deponent interface 1850B by the user may result in additional interfaces being presented, and such additional interfaces are not shown herein for simplicity of the present disclosure.

Figure 18D:
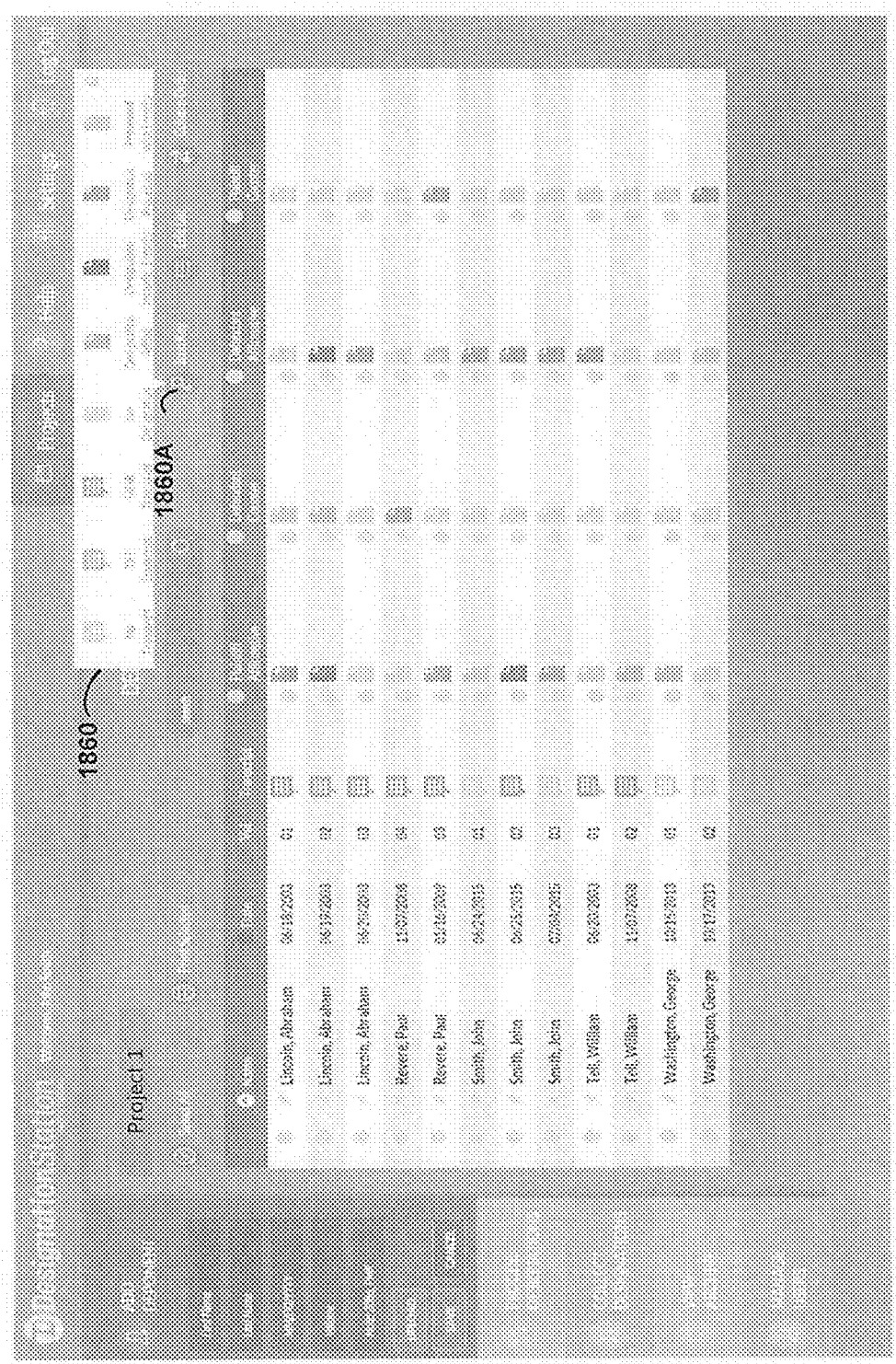
FIG. 18D is a diagram of an illustrative embodiment of a legend including information representative of various states of elements.

Referring to FIG. 18D, an illustrative embodiment of a legend including information representative of various states of elements is shown as a legend 1860. The legend 1860 may be presented in response to selection of a legend control 1860A, and may present information that indicates the meaning of various states of the elements (e.g., the states of the deposition testimony transcript icons 1844, the states associated with the icons presented adjacent the radio buttons 1840B, 1840C, 1840D, 1840E, etc.). By including the legend 1860A, the user may easily determine the meaning of various information presented in the display area 1810, thereby simplifying the use of the GUI 1800.

Figure 18E:
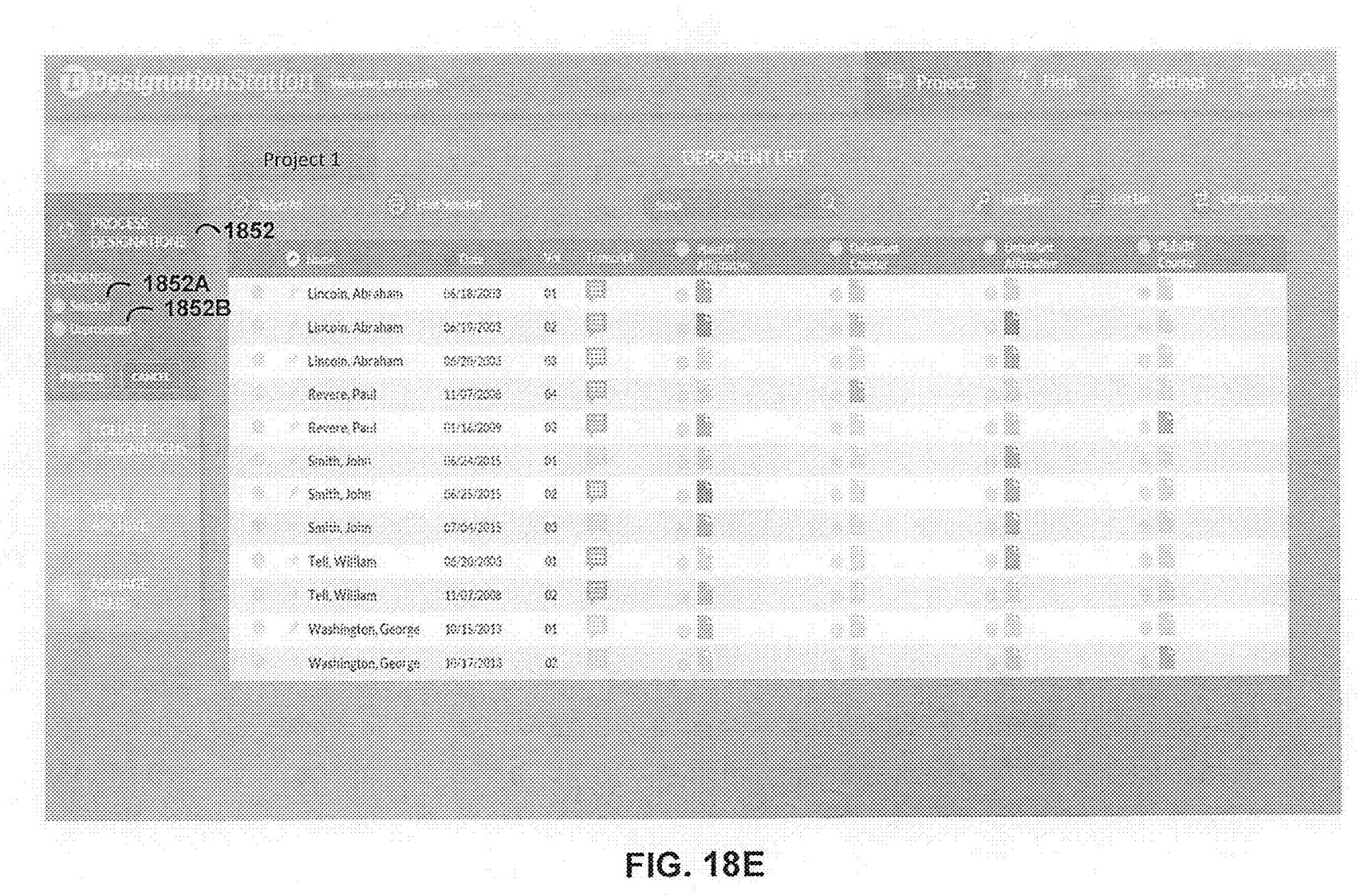

Referring to FIG. 18E, an illustrative embodiment of a process designations interface for processing designations made with respect to deposition testimony transcripts for one or more deponents is shown at a process designations interface 1852. In an embodiment, processing designations may include generating a markup copy of the deposition testimony transcript that has designated portions marked up or highlighted, as described above with respect to FIG. 9, and as described below with respect to FIGS. 22A and 22B. As shown in FIG. 18E, the process designations interface 1852 includes a first control 1852A and a second control 1852B. In an embodiment, the first control 1852A may be used to initiate processing of designations for selected deposition testimony transcripts and/or selected designation categories. For example, a user may use the radio buttons 1840A to select various deponents/deposition testimony transcripts (e.g., rows) to be processed, and/or may use the radio buttons 1840B, 1840C, 1840D, 1840E to select various designations to be processed. Once the radio buttons have been selected, the selection of the first control 1852A may initiate processing of the deposition testimony transcript with respect to the selected deposition testimony transcripts/deposition categories. Thus, the first control 1852A may be used to quickly process designations for selected rows and/or designation categories.

In an embodiment, the second control 1852B may be used to initiate processing of unprocessed deposition testimony transcripts. For example, selection of the second control 1852B may initiate processing of all deposition testimony transcripts with respect to any designations that have been provided, but not yet processed (i.e., any designations associated with the second designation state). Allowing a user initiate processing of all unprocessed designations in response to selection of the second control 1852B allows the user to quickly complete all unfinished work for an entire designation project.

Figure 18F:
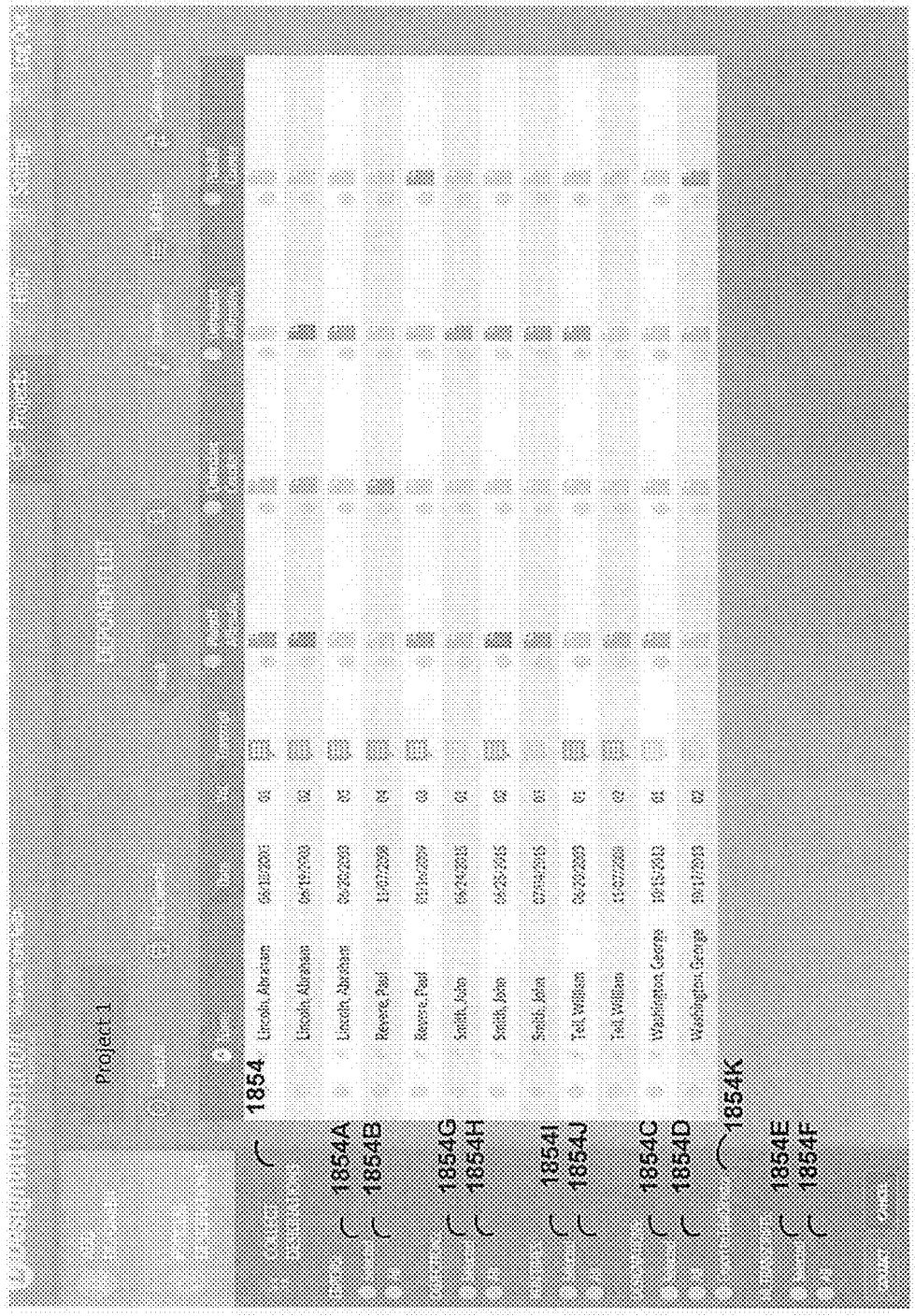
FIG. 18F is a diagram of an illustrative embodiment of a collect designations interface.

Referring to FIG. 18F, an illustrative embodiment of a collect designations interface is shown as a collect designations interface 1854. In an embodiment, the collect designations interface may be used to output processed designations. As shown in FIG. 18F, the collect designations interface 1854 includes a first collect designations control 1854A, a second collect designations control 1854B, a third collect designations control 1854C, a fourth collect designations control 1854D, a fifth collect designations control 1854E, a sixth collect designations control 1854F, a seventh collect designations control 1854G, an eighth collect designations control 1854H, a ninth collect designations control 1854I, and a tenth collect designations control 1854J, and an eleventh collect designations control 1854K.

The first collect designations control 1854A may initiate output of only selected designations that contain errors, and the second collect designations control 1854B may initiate output of all designations that contain errors. The third collect designations control 1854C may initiate output of only selected designations, and the fourth collect designations control 1854D may initiate output of all designations. The fifth collect designations control 1854E may initiate output of highlighted designation transcripts for selected designations, and the sixth collect designations control 1854F may initiate output of highlighted designation transcripts for all designations. The seventh collect designations control 1854G may initiate output of only selected designations that contain objections, and the eighth collect designations control 1854H may initiate output all designations that contain objections. The ninth collect designations control 1854I may initiate output of runt-times for selected designations, and the tenth collect designations control 1854J may initiate output of runt-times for all designations. The eleventh collect designations control 1854K may initiate the exporting of designations to a third party software (e.g., TRIALDIRECTOR®) for further processing. In an embodiment, initiating the export of designations to a third party software may include generating a file (e.g., a file image) that includes information representative of the designations, where the information included in the file is formatted according to a format of the third party software such that the information may enable the third party software to generate additional information (e.g., create video excerpts of recorded video of the corresponding deposition testimony, etc.).

Figure 18G:
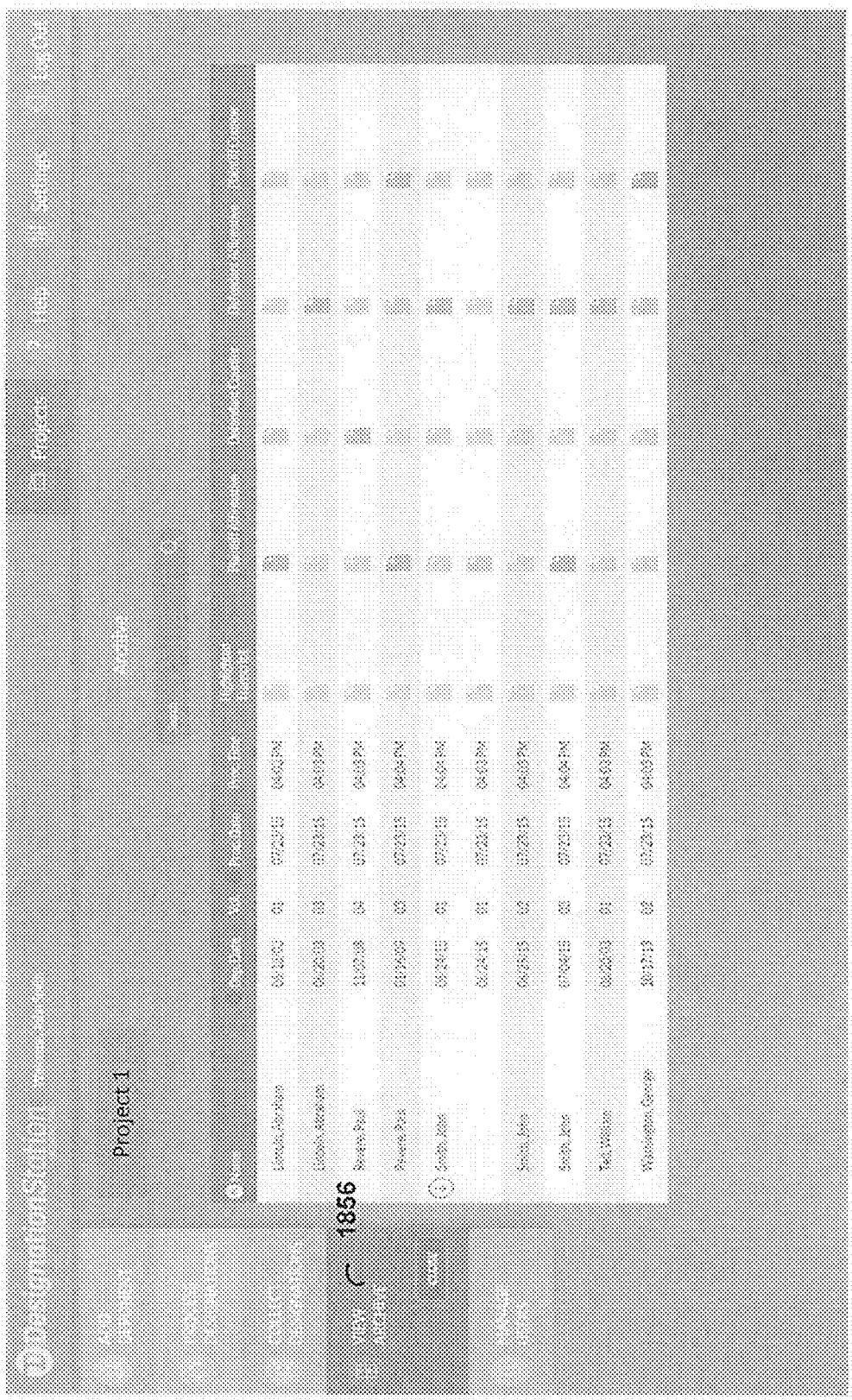
FIG. 18G is a diagram of an illustrative embodiment of a view archive interface.

Referring to FIG. 18G, an illustrative embodiment of a view archive interface is shown as an archive interface 1856. As shown in FIG. 18G, interaction with the archive interface 1856 may cause the display area 1810 to present an archive of the designation project, where the archive includes a log of all changes and events that have occurred with respect to the designation project. Additionally, the archive may include a clean/unmodified copy of all deposition testimony transcripts provided for the designation project. As shown in FIG. 18G, each row may be expanded (indicated by the downward facing arrow) to expand the amount of information associated with a particular row (e.g., a particular deposition testimony transcript). Selection of the arrow may toggle the row from its expanded form to a condensed form. As illustrated in FIG. 18G, the interface includes a column associated with a processing date (Proc. Date), and a column associated with a processing time (Proc. Time). Each time that a deposition testimony transcript is processed, or otherwise modified, a copy of the deposition testimony transcript may be stored in the archive. So, for example, when a deposition testimony transcript is uploaded to the system, a clean copy may be stored in the archive, and then when plaintiff affirmative designations are processed, a copy of the deposition testimony transcript with the plaintiff affirmative designations may be stored in the archive, and so on. In an embodiment, the versions stored in the archive may be used to provide version control. For example, if the user wants to revert to a previous version of the deposition testimony transcript, they can access the version through the archive, and make the version the current version.

Figure 18H:
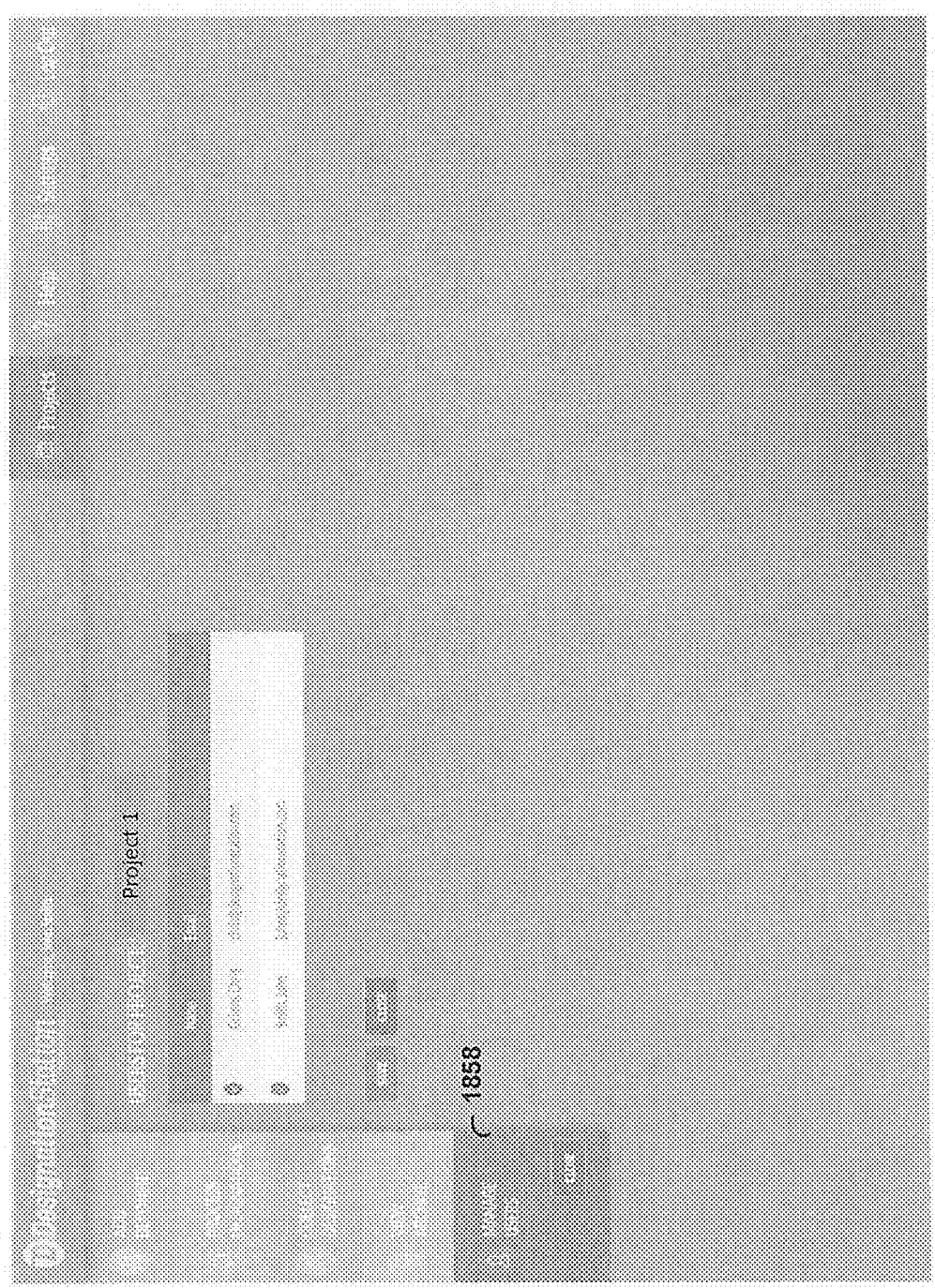
FIG. 18H is a diagram of an illustrative embodiment of a manage users interface.
Figure 18I:
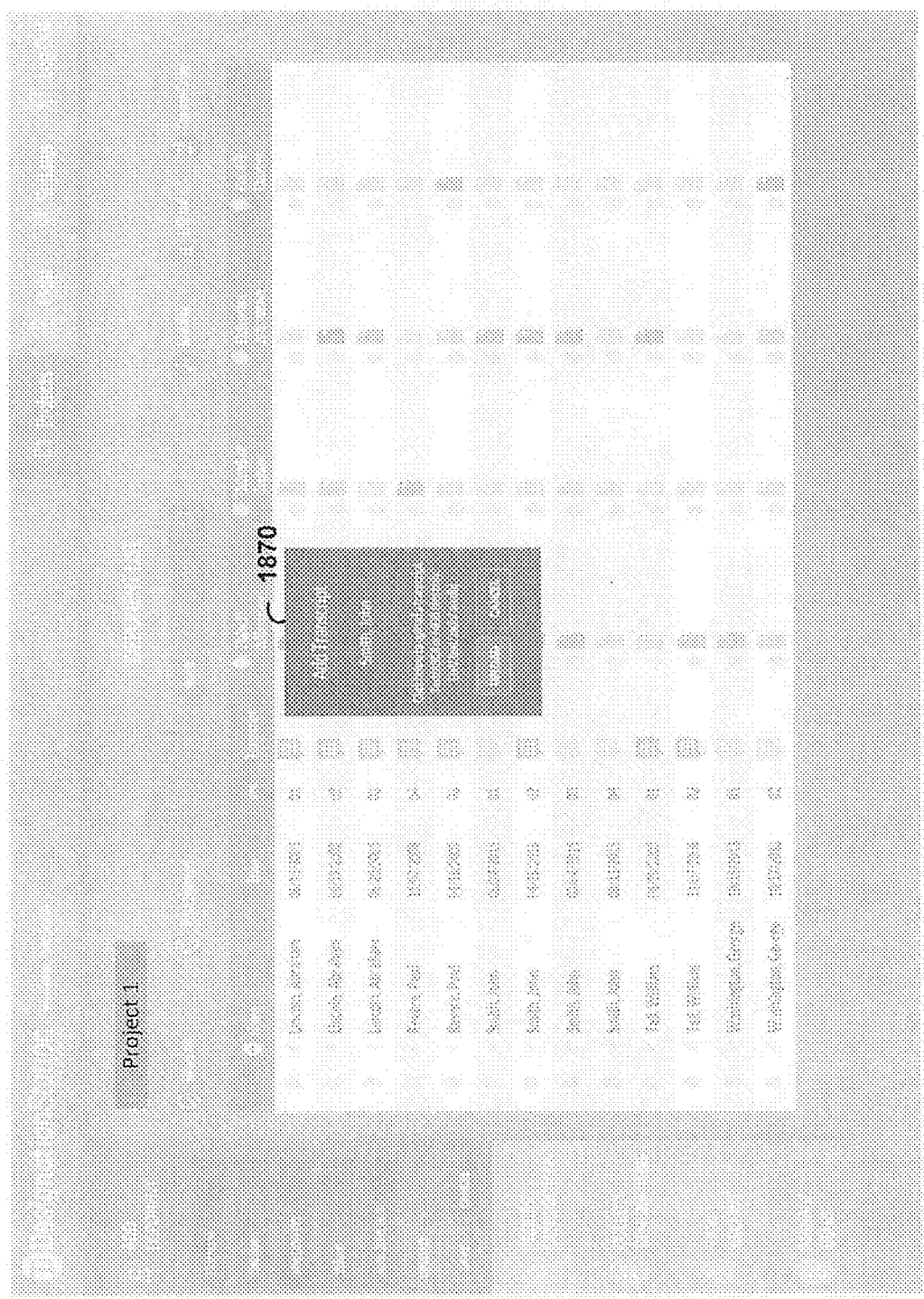
FIG. 18I is a diagram of an exemplary add transcript interface for uploading one or more deposition testimony transcripts.

Referring to FIG. 18H, an illustrative embodiment of a manage users interface is shown as a manage users interface 1858. As shown in FIG. 18H, the manage users interface 1858 may be used to display information associated with users that are assigned to or otherwise authorized to access the designation project.

Referring to FIG. 18J, an illustrative embodiment of an error log associated with a designation project is shown. In an embodiment, the error log illustrated in FIG. 18J may have been generated in response to a selection of the first collect designations control 1854A, or the second collect designations control 1854B of FIG. 18F. As shown in FIG. 18J, the error log may include information indicating the name of the deponent, the date of the deponent's deposition, the designation category containing the error, the designation that contains the error, and the reason for the error. The error log may be used to quickly identify and correct errors in designations provided by the user.

Figure 18K:
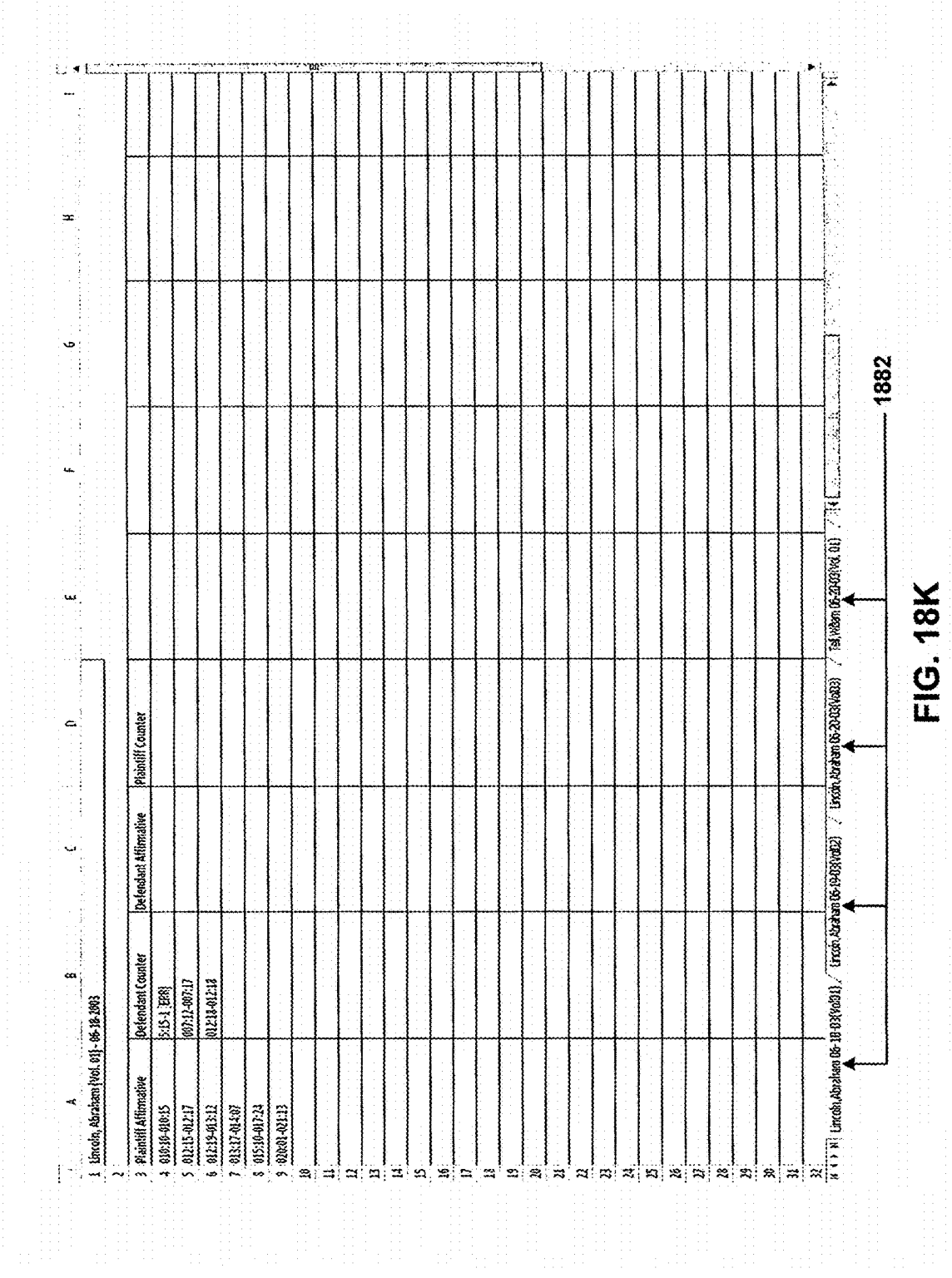

Referring to FIG. 18K, an illustrative embodiment of a collection of designations associated with a designation project is shown. In an embodiment, the collection of designations illustrated in FIG. 18K may have been generated using, the third collect designations control 1854C or the fourth collect designations control 1854D of FIG. 18E. As shown in FIG. 18K, the collection of designations may include tabs 1882 for each deponent/deposition, and each of the tabs 1882 may present information for various designations made with respect to a particular deponent/deposition. The collection of designations may provide the user with a quick reference to various designations made with respect to the deponents and depositions associated with the designation project.

Referring to FIG. 18L, an illustrative embodiment of an objection log associated with a designation project is shown. In an embodiment, the objection log illustrated in FIG. 18L may have been generated in response to a selection of the seventh collect designations control 1854G, or the eighth collect designations control 1854H of FIG. 18E. As shown in FIG. 18L, the objection log may include information indicating the name of the deponent, the date of the deponent's deposition, notes associated with the designation (as may have been input using the note entry field in the add deponent interface 1850A of FIG. 18A, or using the note entry field in the edit deponent interface 1850B of FIG. 18A), the designation category containing the objection, the designation that contains the objection, the location of the objection, and the text of the objection. The objection log may be used to quickly identify and correct errors in designations provided by the user.

Referring to FIG. 18M, an illustrative embodiment of a run-time log associated with a designation project is shown. In an embodiment, the run-time log illustrated in FIG. 18M may have been generated in response to a selection of the ninth collect designations control 1854I, or the tenth collect designations control 1854J of FIG. 18F. As shown in FIG. 18M, the run-time log may include information indicating the name of the deponent, the date of the deponent's deposition, the volume identifier associated with the deponent's deposition, and information indicating the run-times for each of the designation categories. The run-time log may be used to quickly determine run-times for designations provided by the user.

Figure 19A:
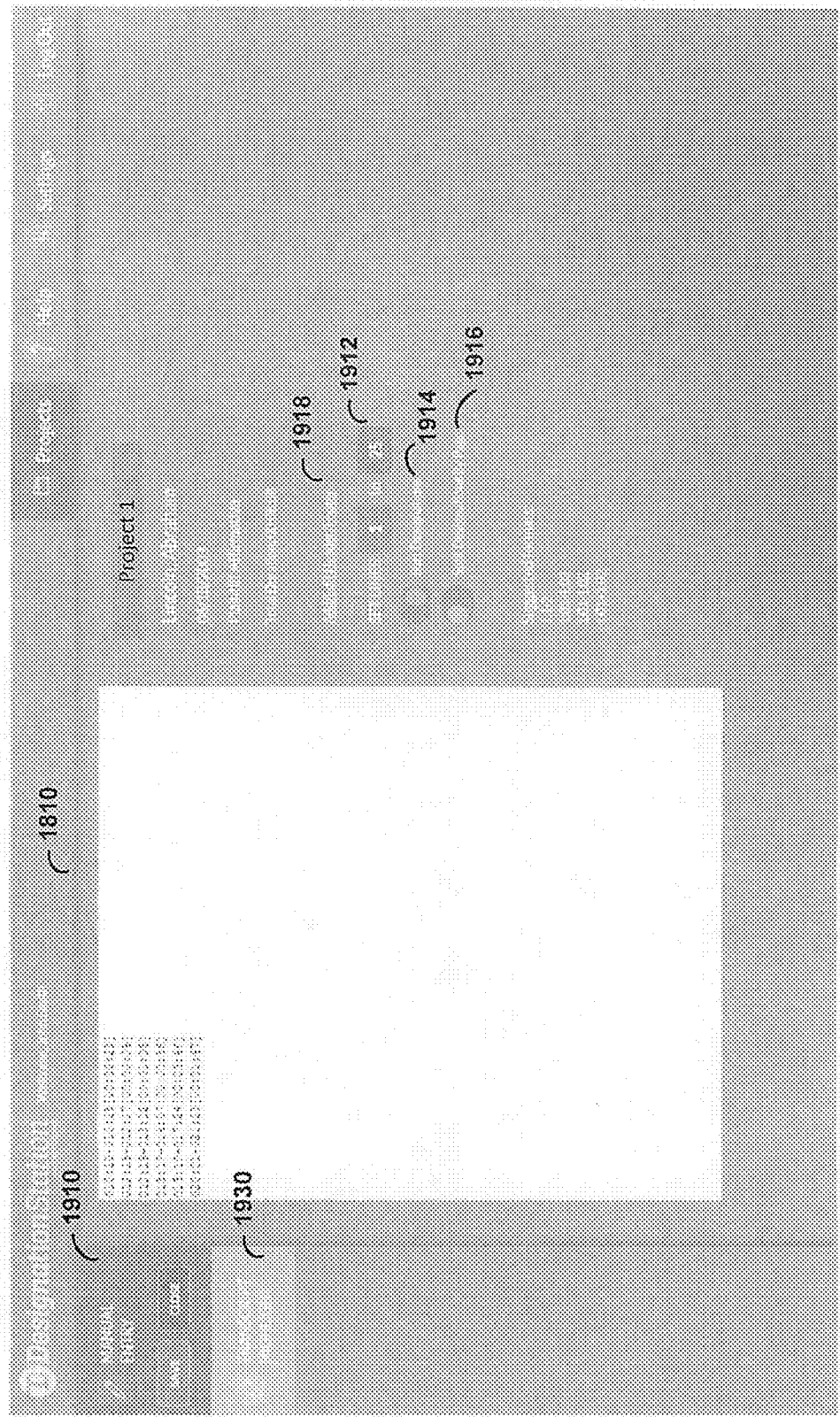
FIG. 19A is a diagram of an illustrative embodiment of an interface for providing designations.

Referring to FIG. 19A, an illustrative embodiment of an interface for providing designations is shown. As shown in FIG. 19A, the display area 1810 may be updated to present a manual entry interface control 1910 and a transcript highlight interface control 1930. During use of the manual entry interface control 1910, a set lines control 1912 may be provided that enables the user to configure a starting line for the designations, and an ending line for the designations. Additionally, a sort designations control 1914 may be provided and may be toggled on or off. When the sort designations control 1914 is toggled on, the manually entered designations may be automatically sorted by page and then line number. This may enable duplicate or overlapping designations to be more quickly identified. A split designation by page control 1916 is also provided, and, when toggled on, may split any designations that span multiple pages into one or more designations that contain lines for a single page of the transcript. The new split line numbers are determined based on the start and end lines for that specific designation set. An add header/footer control 1918 may also be provided, and may enable a user to configure a header and/or footer that may be used when outputting the designations, as described further with reference to FIG. 19E.

Figure 19B:
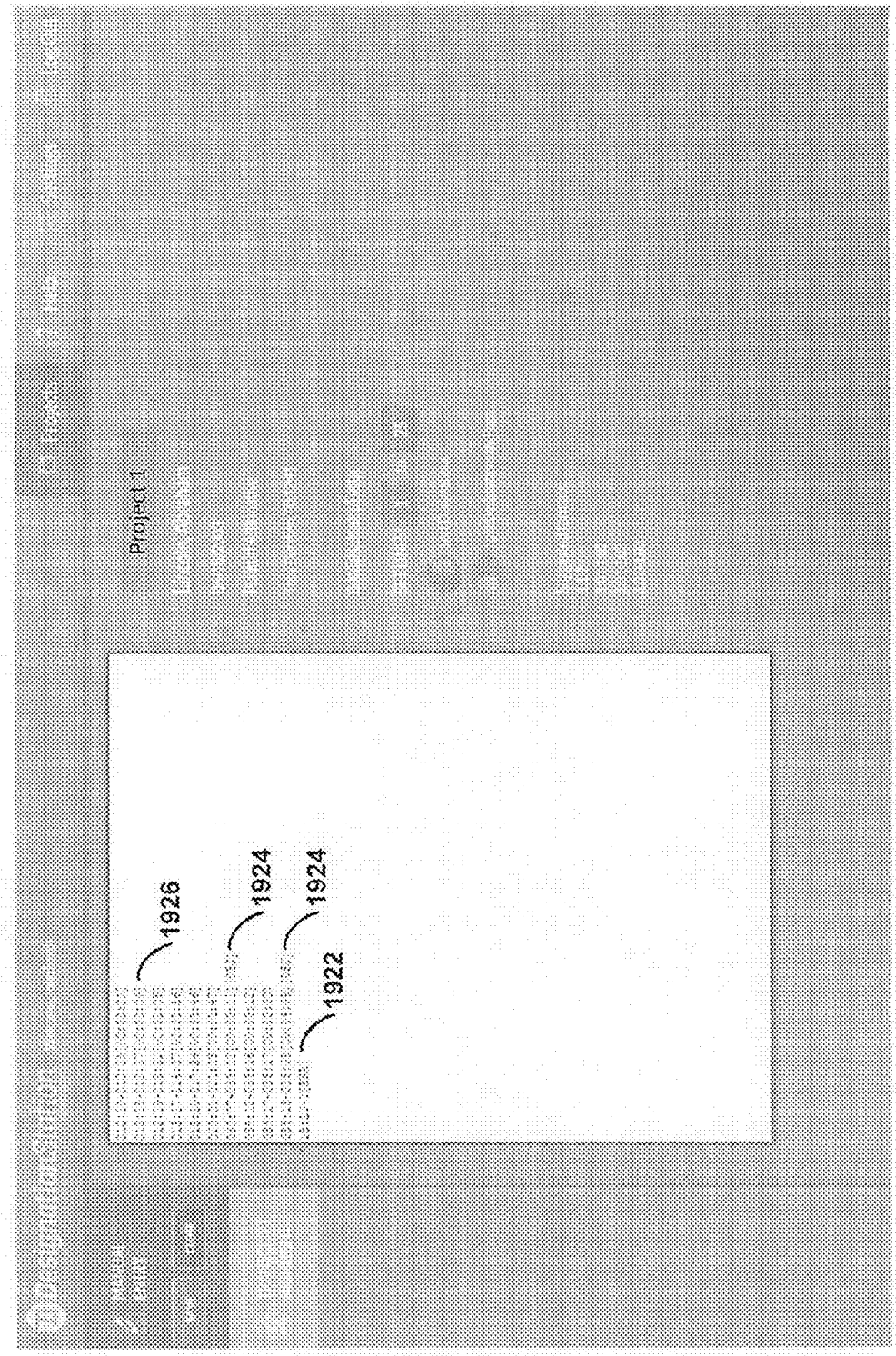
FIG. 19B is a diagram of an illustrative embodiment of performing dynamic error checking for designations.

Referring to FIG. 19B, an illustrative embodiment of performing dynamic error checking for designations is shown. During manual entry of the designations, the designation server 1710 may automatically check the designation entries for errors. When an error is found, the interface for providing the designations may be updated to indicate the error, as shown at 1922, where an error has been detected in the designation 22.7-1 because the designation identifies an ending line that is lower than the starting line (e.g., the designation 22.7-1 starts on page 22 line 7 and ends on page 22 line 1). By providing dynamic real-time error checking, errors in designations may quickly identified and corrected before the designations are processed. In an additional or alternative embodiment, the designation server 1710 may automatically check the designation entries for objections, which may be noted by placing an indicator (e.g., [OBJ]) adjacent any designations that contain objections, as shown in FIG. 19B at 1924. In yet another additional or alternative embodiment, the designation server 1710 may automatically calculate run-times for the designation entries, which may be noted by placing a run-time indicator (e.g., [xx:xx:xx] [hours:minutes:seconds]) adjacent each of the designations, as shown in FIG. 19B at 1926. It is noted that, in an embodiment, the interface illustrated in FIG. 19B, or another interface disclosed herein, may include a search feature (e.g., the search feature shown in FIG. 18B) that allows the user to search designations for particular keywords or phrases, search for objections, etc., and the results of the search may be presented as a report that may be similar to the information described with reference to FIGS. 18J-18M, noting the designation category, page:line(s), deposition transcript, deponent, volume, etc. where the searched term(s) were found.

Figure 19C:
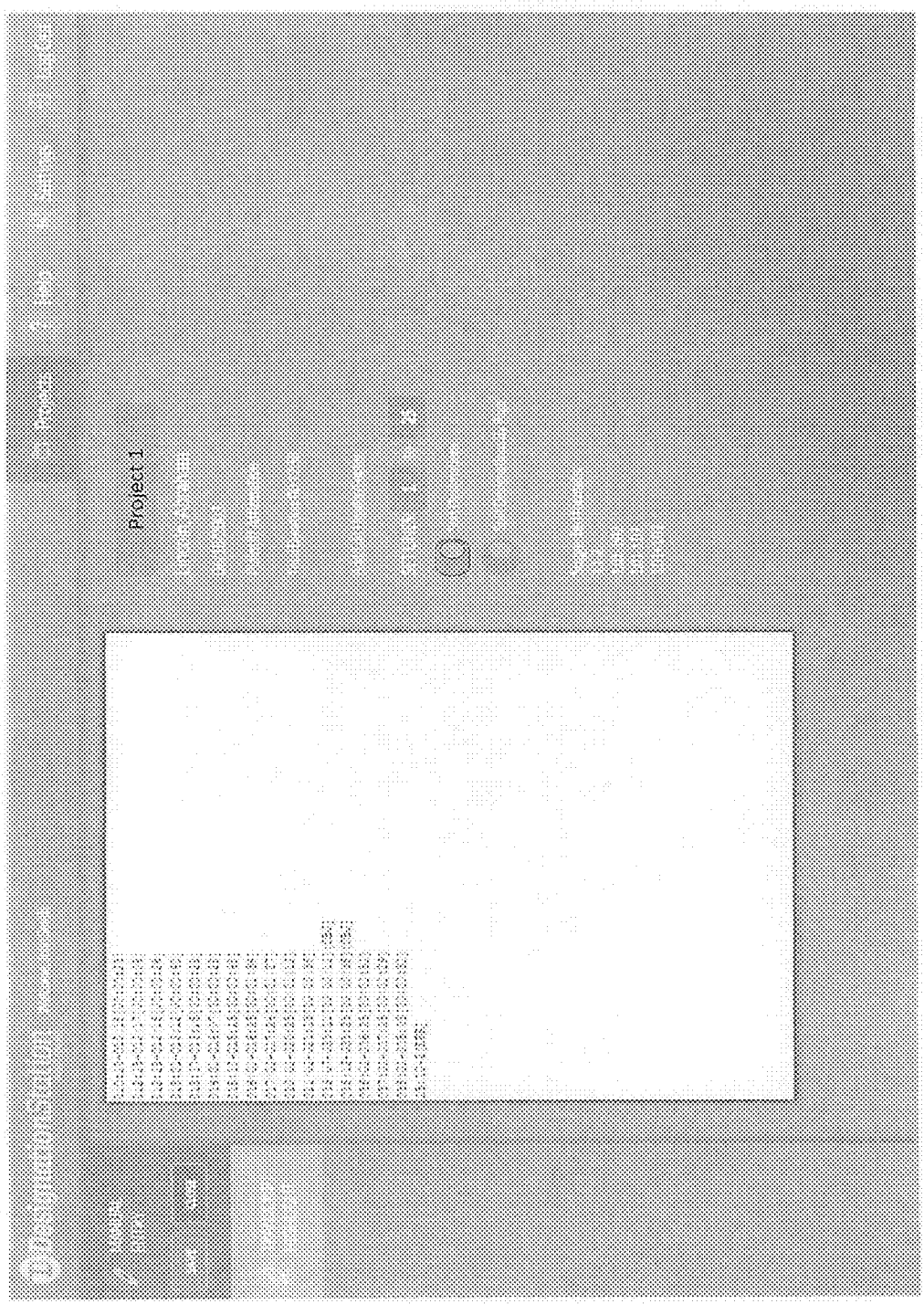
FIG. 19C is a diagram of an illustrative embodiment of combining manually entered designations.

Referring to FIG. 19C, an illustrative embodiment of splitting designations by page is shown. When compared to designations of FIGS. 19A and 19B, it can be seen in FIG. 19C that designations of FIGS. 19A and 19B that span multiple pages have been split, such that each designation entry is associated with a single page of the deposition testimony transcript. For example, the designation 012:19-

013:12 [00:01:05] of FIG. 19B has been split into the designations 012:19-012:25 [00:00:26] and 013:1-013:12 [00:00:40] in FIG. 19C.

Figure 19D:
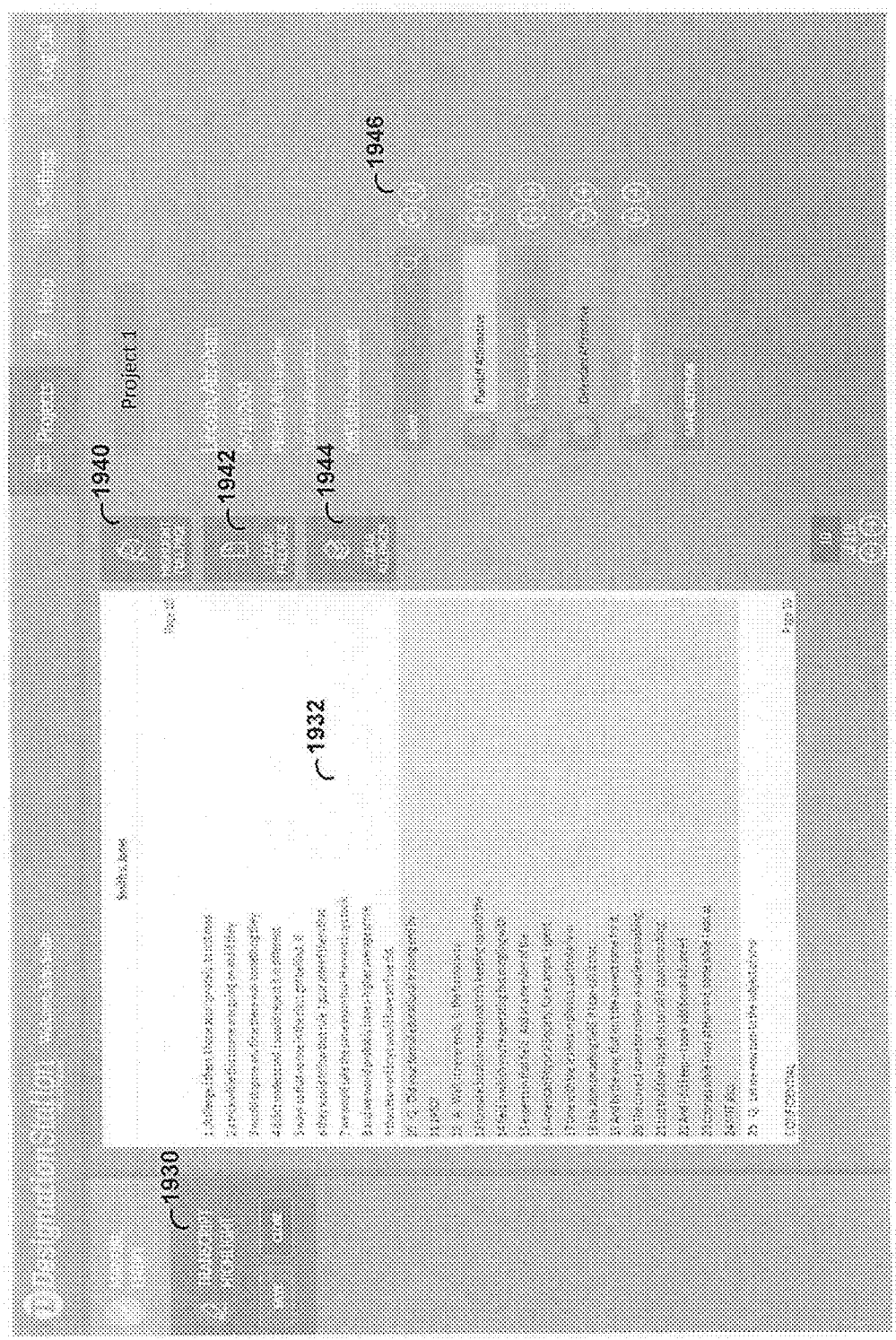
FIG. 19D is a diagram of an illustrative embodiment of entering designations using highlighting.

Referring to FIG. 19D, an illustrative embodiment of entering designations using highlighting is shown. As briefly described above, in an embodiment, the transcript highlight interface control 1930 may be utilized to enable the user to provide designations by highlighting a deposition testimony transcript, as indicated at 1932. It is noted that real-time error checking and combining may automatically occur when the designations are provided by highlighting. For example, when text is being highlighted, the designation server may verify that such highlighted text has not previously been designated by another party, and, if the text has been previously highlighted/designated, may present a warning or error indicating that the designated text has already been designated. In an embodiment, designation run-time may be automatically calculated and/or adjusted as lines are highlighted/selected or de-highlighted/de-selected.

As shown in FIG. 19D, when utilizing the transcript highlight interface control 1930, a highlight full page control 1940 may be provided and, if selected, may result in the entire displayed page of the deposition testimony transcript being highlighted (i.e., designated). A clear full page control 1942 is also provided and may be used to clear all highlighting from the displayed page of the deposition testimony transcript. A clear all pages control 1944 is also provided and may be used to clear all highlighting from all pages of the deposition testimony transcript.

Additionally, controls 1946 may also be provided that allow the user to enable view of highlighting to a particular designation category, and to search for designations (e.g., clicking the right arrow will search the deposition testimony transcript for subsequent designations and clicking the left arrow will search the deposition testimony transcript for previous designations). In an embodiment, different colors may be used to highlight different portions of the deposition testimony transcript for different designation categories. For example, plaintiff affirmative designations may be viewed in a first color (e.g., yellow), defendant counter designations may be viewed in a second color (e.g., pink), defendant affirmative designations may be viewed in a third color (e.g., blue), and plaintiff counter designations may be viewed in a fourth color (e.g., green). Enabling highlighting or viewing of the various categories of designations in different colors may make the designations more understandable, and may also assist the user in identifying the party making the relevant designation. In an embodiment, the interface illustrated in FIG. 19D may only enable the user to modify designations within a single category. For example, if the user initiates presentation of the interface of FIG. 19D to enter plaintiff affirmative designations, the user may only edit/modify designations associated with the plaintiff affirmative designations category.

Figure 19E:
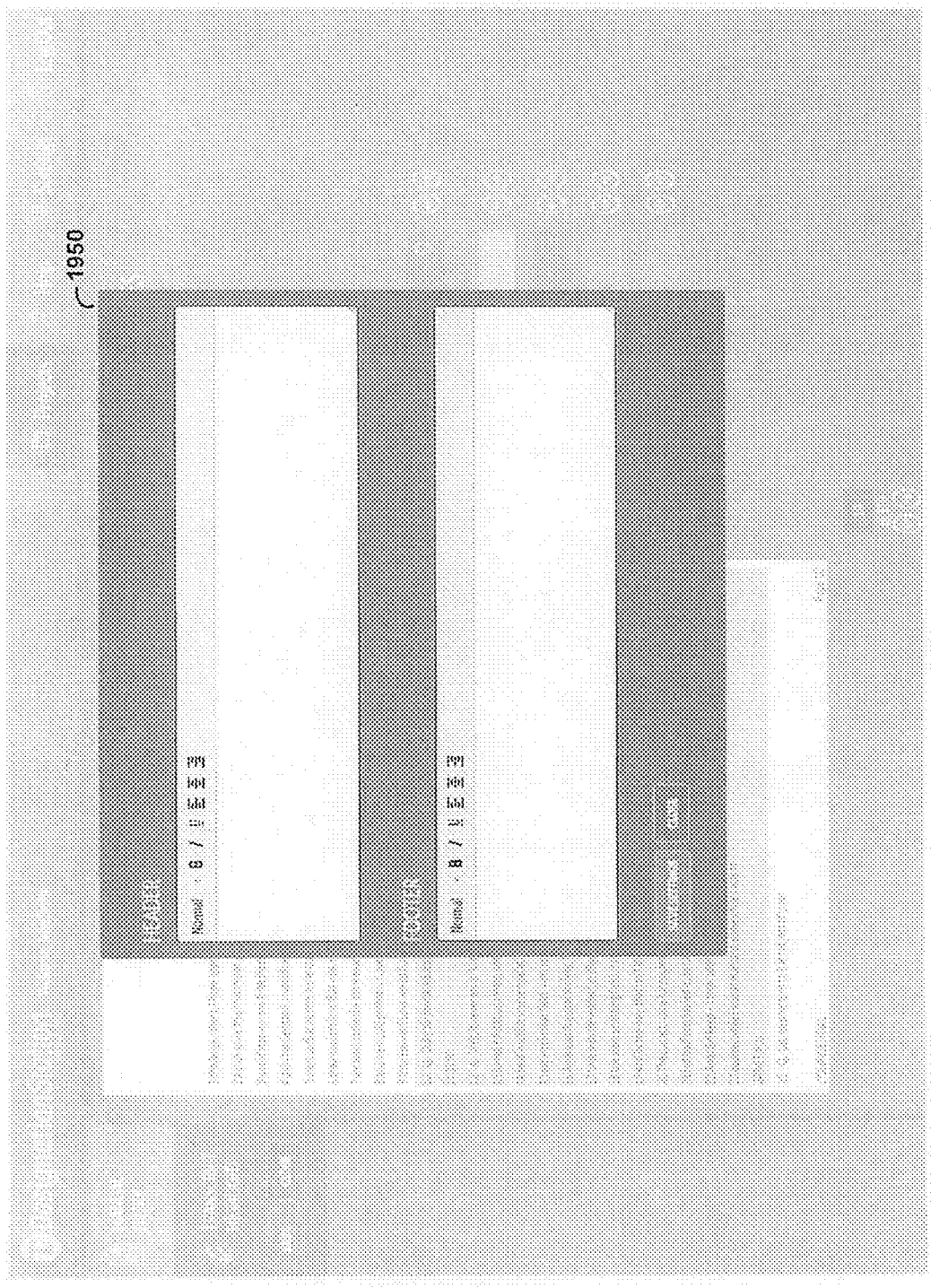
FIG. 19E is a diagram of an illustrative embodiment of an interface for configuring a header/footer in connection with deposition testimony transcript designations.

Referring to FIG. 19E, an illustrative embodiment of an interface for configuring a header/footer in connection with deposition testimony transcript designations is shown. In an embodiment, the interface of FIG. 19E may be presented in response to selection of the header/footer control 1918 of FIG. 19A.

Figure 20:
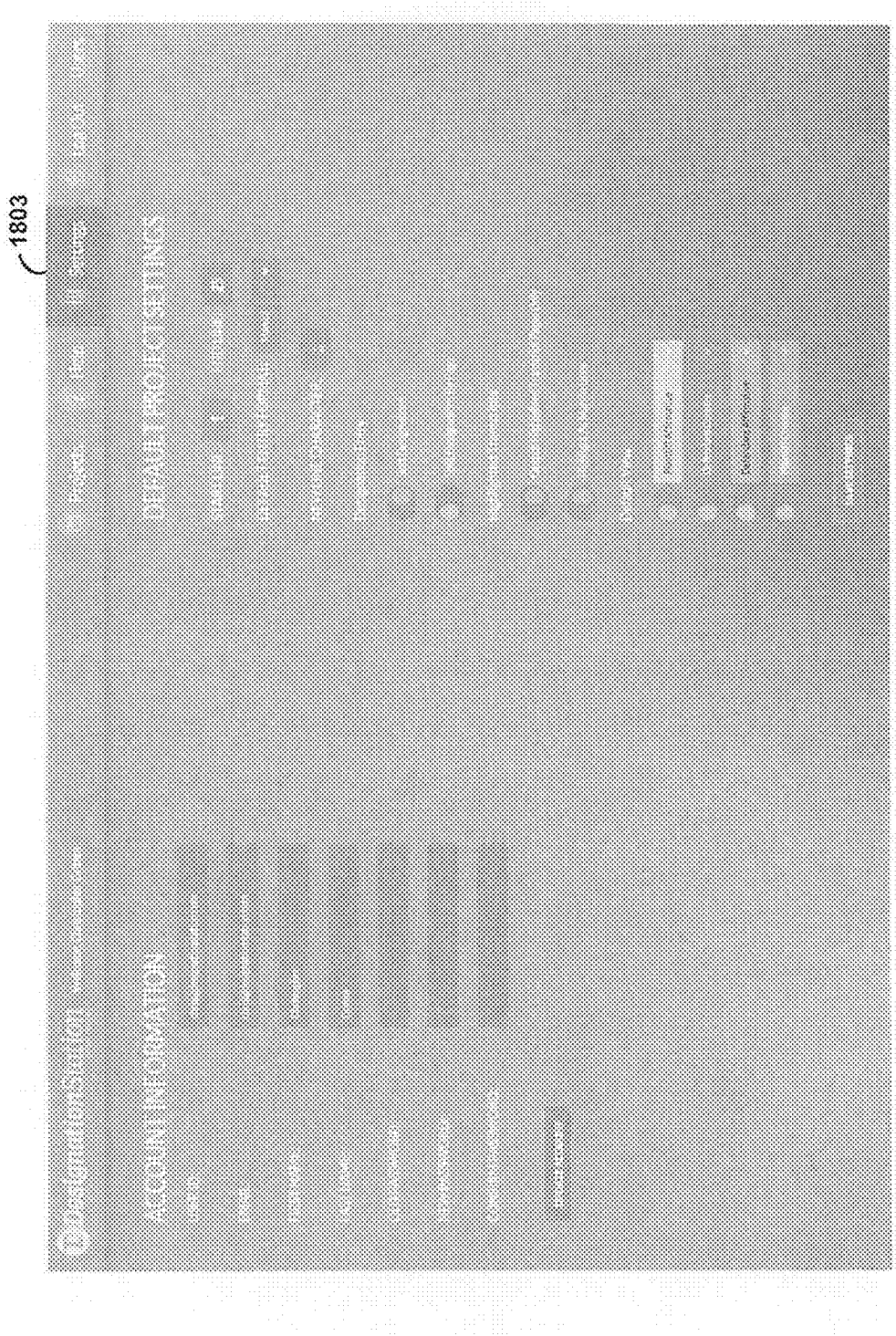
FIG. 20 is a diagram of an illustrative embodiment of an interface for configuring global designation project settings.

Referring to FIG. 20, an illustrative embodiment of an interface for configuring global designation project settings is shown. As shown in FIG. 20, selection of the designation project settings tab 1803 may enable the user to configure settings that are applied to all deponents/depositions included in the designation project. It is noted that FIG. 20 illustrates some controls that are similar to the controls described with reference to FIG. 19D. However, the controls of FIG. 20 differ from the controls of FIGS. 19A-19D in that the controls of FIG. 20 are applied to the entire designation project (i.e., all deposition testimony transcript designations), whereas the controls of FIGS. 19A-19D are specific to the designations being made to a single deposition testimony transcript. FIG. 20 also illustrates additional controls, such as a control to output only pages containing designations, and also includes a control for designating custom new line characters. The control for designating custom new line characters may be beneficial for many users because it allows the user to program the GUI to recognize a custom page break using a string of characters. In many instances, designations may be provided as a long string of text broken by a character or sequence of characters, rather than provided with a single designation on each line of text, and in such instances, the control for designating custom new line characters may enable the user to program the GUI to recognize the designations provided as long strings of text. Thus, the settings/controls provided by the designation project settings tab 1803 provide a robust tool for quickly configuring settings that are to be applied to all aspects of a designation project. Additionally, FIG. 20 illustrates that a user may use the designation project settings tab 1803 to manage the user's account settings, such as changing the user's password.

Figure 21A:
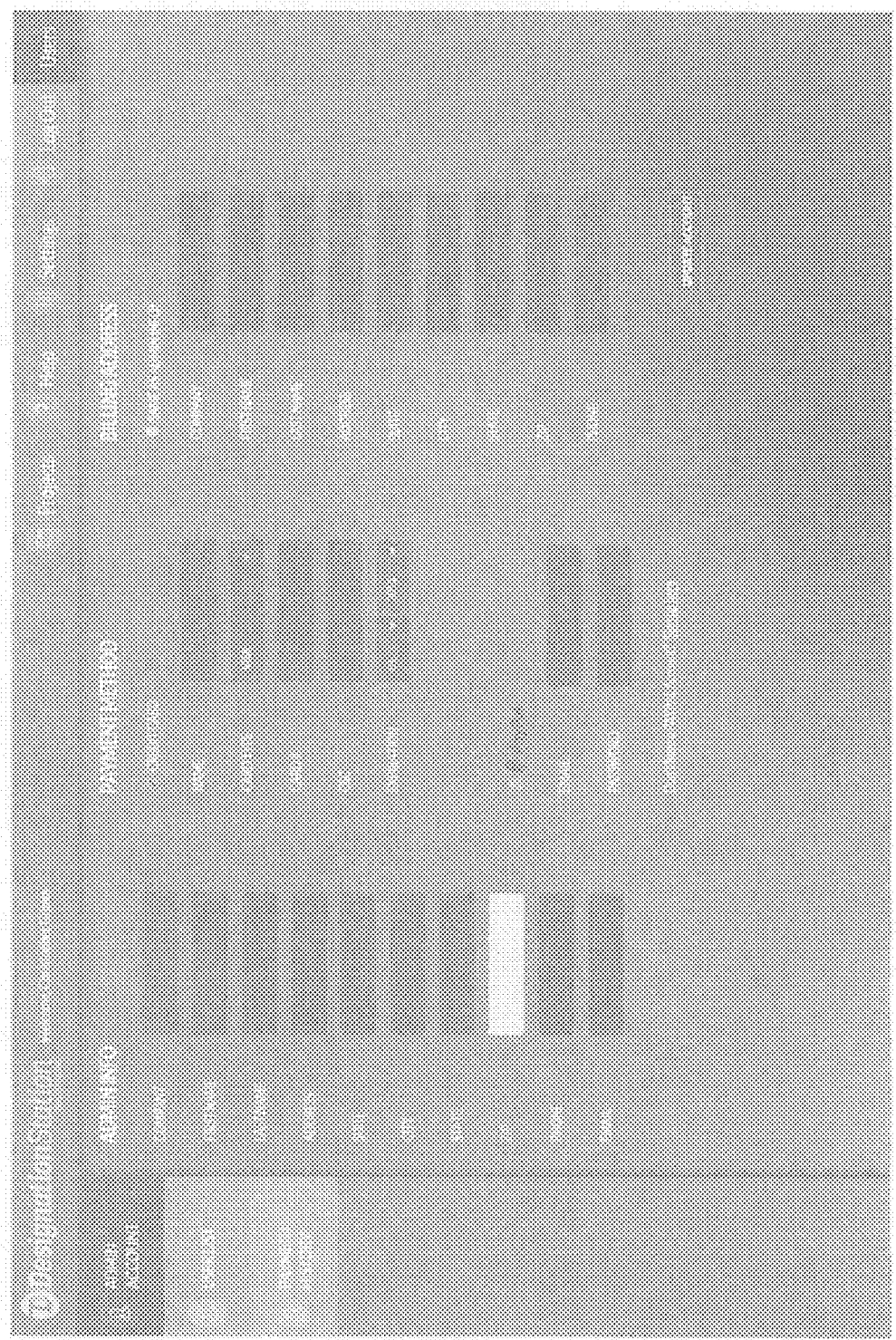
FIG. 21A is a diagram of an illustrative embodiment of an administrator interface that may be provided to configure administrative information for a designation project.

Referring to FIG. 21A, an illustrative embodiment of an administrator interface that may be provided to configure administrative information for a designation project is shown. As shown in FIG. 21A, the administrator may specify administrator information, payment information, and billing address information for a designation project.

Figure 21B:
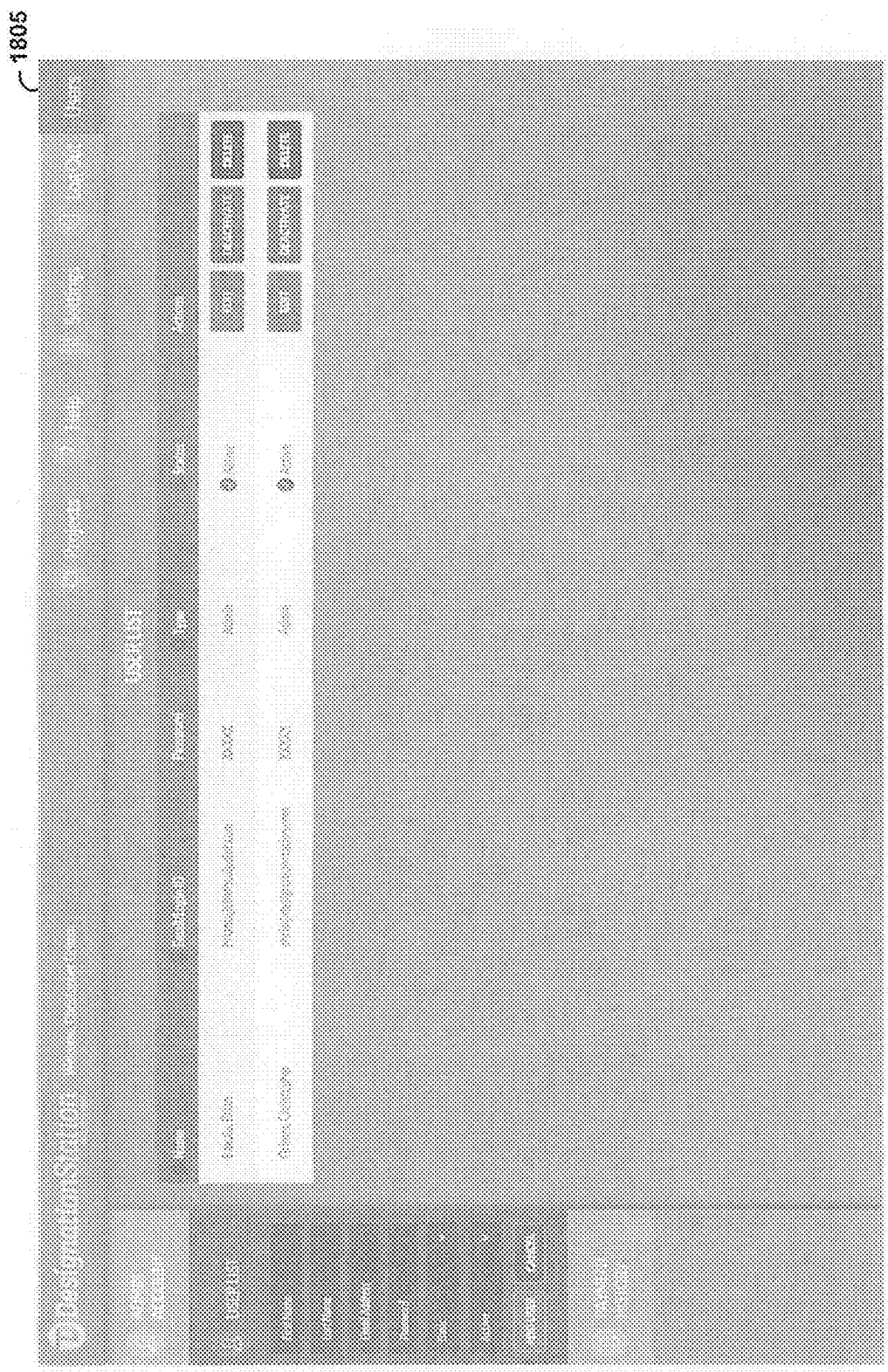
FIG. 21B is a diagram of an illustrative embodiment of an interface that may be provided to configure users for a designation project.

Referring to FIG. 21B, an illustrative embodiment of an interface that may be provided to configure users for a designation project is shown. In an embodiment, the interface of FIG. 21 may be presented in response to selection of the users tab 1805, and may enable a project manage or administrator to assign users to a designation project.

Figure 21C:
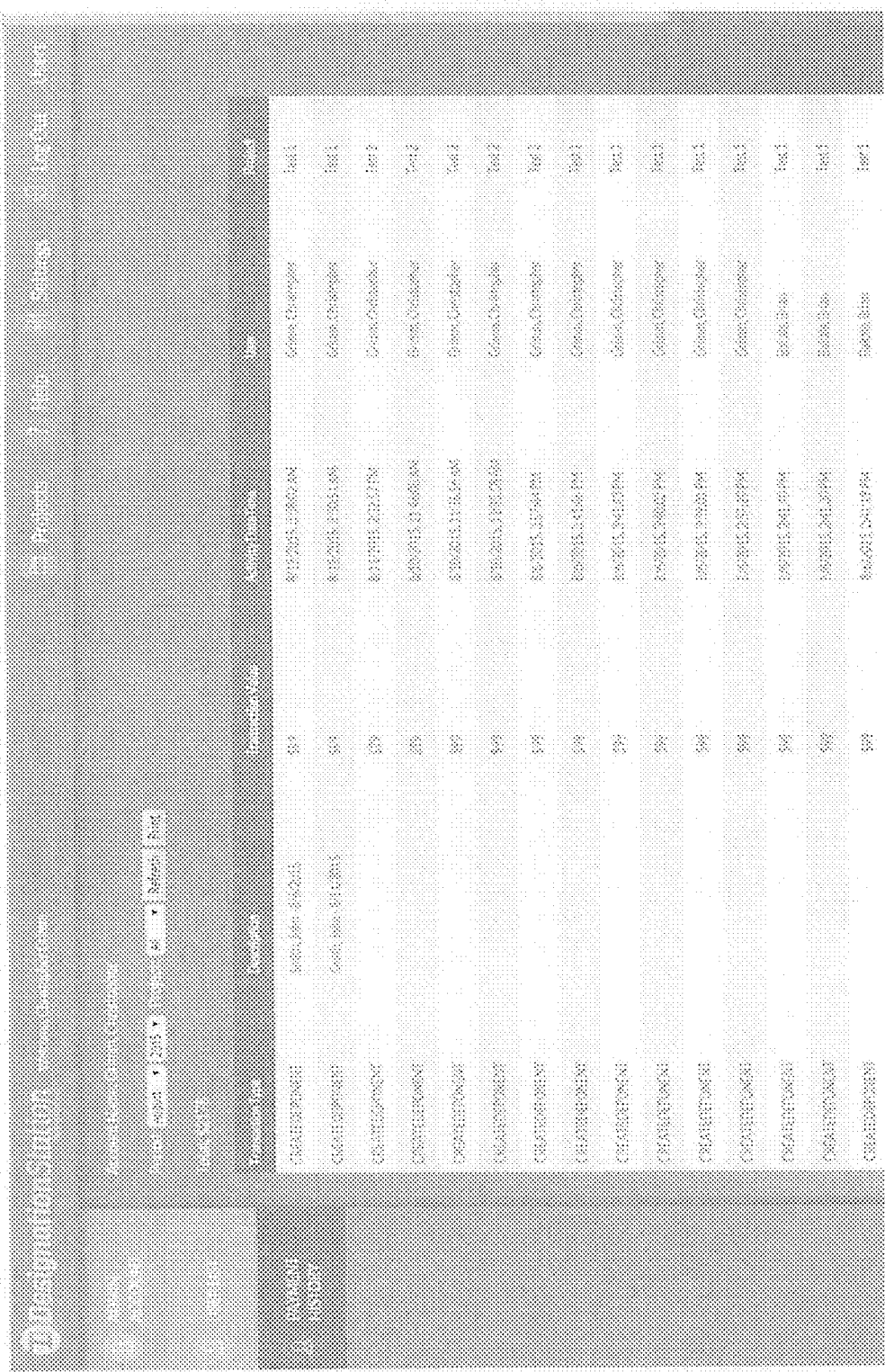
FIG. 21C is a diagram of an illustrative embodiment of an interface for viewing a payment history for one or more designation project accounts.

Referring to FIG. 21C, an illustrative embodiment of an interface for viewing a payment history for one or more designation project accounts is shown. The interface of FIG. 21C may enable a user to view a log of transactions and billing information in connection with one or more designation project.

Referring to FIG. 22A, an illustrative embodiment of an output generated in connection with a designation project is shown. As shown in FIG. 22A, the output is a page of a deposition testimony transcript that has been modified to include designations. The designations may be in the form of highlighted portions of the text, and may include plaintiff affirmative designations 2210, defendant counter designations 2220, defendant affirmative designations 2230, and plaintiff counter designations 2240. As shown in FIG. 22A, each of the different categories of designations may be presented in a different color, making it easier for the user to quickly identify the party making the designation. In an embodiment, text that has been designated by, or that is associated with more than one or more designation category may be highlighted in a color that is the combination of the various associated colors. For example, if plaintiff affirmative designations are highlighted in yellow, and defendant counter designations are highlighted in red, any text that is included in both a plaintiff affirmative designation and a defendant counter designation may be highlighted in orange. In an embodiment, the categories associated with the various colors of designated text may be displayed in a legend that is located in the header and/or footer, and may indicate the designation categories associated with each color (e.g., plaintiff affirmative designations=yellow; defendant counter designations=red; text that is both a plaintiff affirmative designation and a defendant counter designation=orange). If the resulting color is gray (or some other color resulting from the combination of more than 2 colors), the legend may simply indicate gray=multiple.

Referring to FIG. 22B, another illustrative embodiment of an output generated in connection with a designation project is shown. FIG. 22B illustrates, at 2250, that the designations may be indicated by highlighting placed in the margins, rather than by highlighting the actual text. By placing the designation highlighting in the margins adjacent to the designated text, the designations may easily be identified, however, because the text is not highlighted, the text may be easier to read. For example, when the text is highlighted, as in FIG. 22A, a black and white print out of the designations may transform the different designation colors to various forms of grey, which may make the text difficult to read. This problem is overcome by placing the highlighting in the margins adjacent the designated text. In an embodiment, a header or footer may include a legend that indicates the run-times for various designations.

Figure 23:
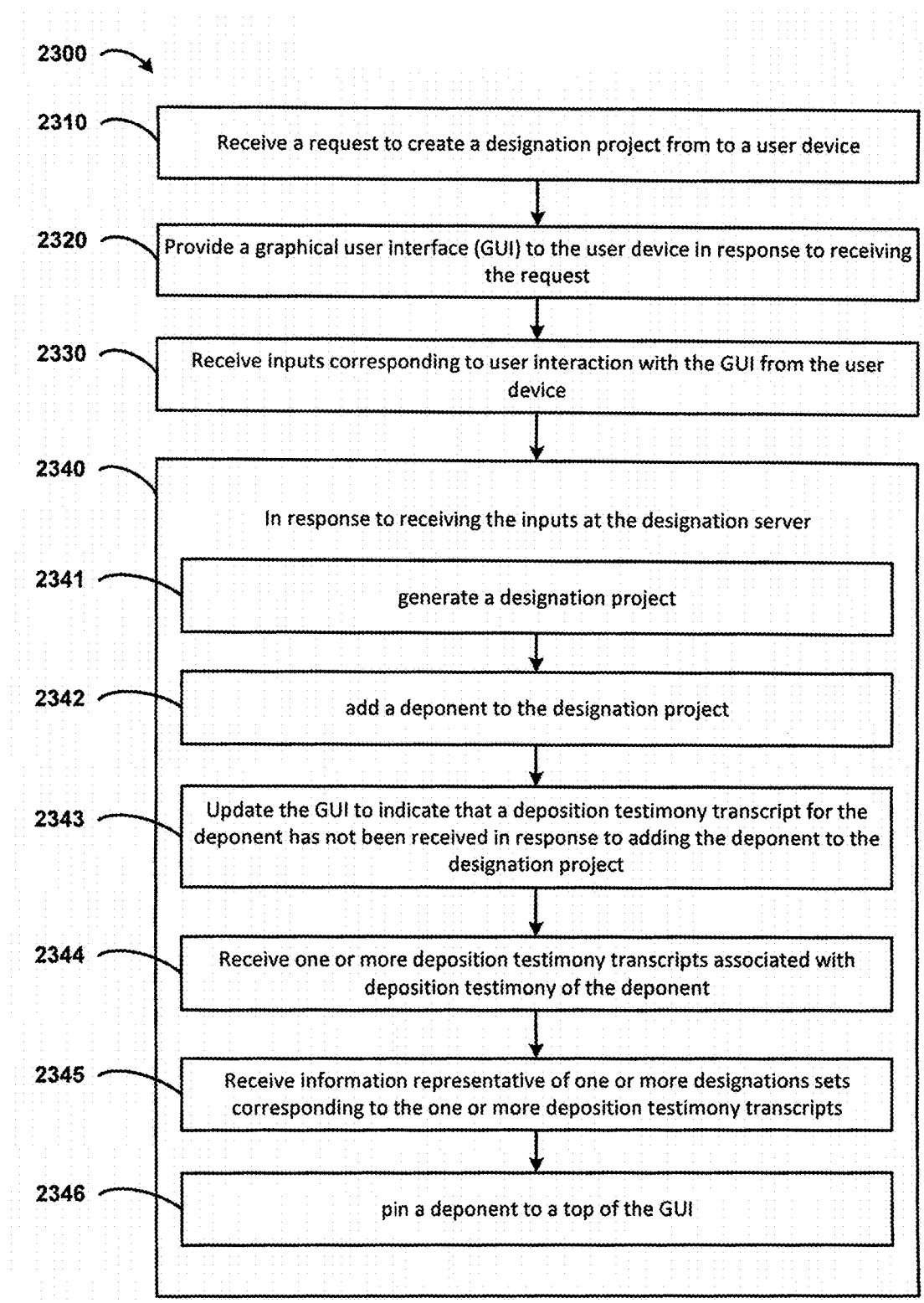
FIG. 23 is a flow diagram of an embodiment of a method for managing and processing deposition testimony transcript designations.

Referring to FIG. 23, a flow diagram of an embodiment of a method for managing and processing deposition testimony transcript designations is shown as a method 2300. In an embodiment, the method 2300 may be performed by the designation server 1710 of FIG. 17 during interaction with a user device (e.g., the user device 1730 of FIG. 17) via a network connection. In an embodiment, the interaction between the designation server 1710 and the user device may be facilitated by user interaction with and inputs provided to one or more user interfaces, such as the various user interfaces described with reference to FIGS. 18A-22B.

At 2310, the method 2300 includes receiving, by a designation server, a request to create a designation project from to a user device. In an embodiment, the request may be received via an input provided to the new project control 1812 of FIG. 18A. At 2320, the method 2300 includes providing a graphical user interface (GUI) to the user device in response to receiving the request. In an embodiment, the GUI provides functionality to create and manage designation projects relating to designation of deposition testimony transcripts. In an embodiment, the method 2300 may include receiving inputs to assign one or more users to the designation project. Each of the one or more assigned users may be associated with a role that identifies a set of permissions that each of the one or more assigned users are authorized to perform with respect to the designation project. The role may be one of a project manager role, an administrative role, and a basic user role. When the role is a project manager role, the user is authorized to assign other existing users and accounts to the designation projects that they have created, or have been allowed access to. When the role is an administrative role, the user is authorized to assign existing users to any designation project that is associated with their account, whether they have been explicitly granted access to that designation project or not. When the role is the basic user role, the user is authorized to use the designation projects that they have been assigned to. At 2330, the method 2300 includes receiving, by the designation server, inputs corresponding to user interaction with the GUI from the user device. In an embodiment, the inputs may correspond to inputs provided via one or more of the GUIs illustrated and described with reference to FIGS. 18A-22B.

At 2340, in response to receiving the inputs at the designation server, the method 2300 may include, at 2341, generating a designation project, and, at 2342, adding a deponent to the designation project. In an embodiment, the deponent may be added using the add deponent interface 1850A. At 2343, the method 2300 may include updating the GUI to indicate that a deposition testimony transcript for the deponent has not been received in response to adding the deponent to the designation project. In an embodiment, the indication that the deposition testimony transcript has not been received may be provided by configuring a deposition testimony transcript icon 1844 to be in a first state (e.g., the state indicated by the deposition testimony transcript icon 1844A). At 2344, the method 2300 includes receiving one or more deposition testimony transcripts associated with deposition testimony of the deponent. In an embodiment, in response to receiving the one or more deposition testimony transcripts, the deposition testimony transcript icon 1844 may be configured to be in a second state (e.g., the state indicated by the deposition testimony transcript icon 1844B). In an embodiment, the one or more deposition testimony transcripts may be uploaded using a bulk upload feature, as described above. In another embodiment, the one or more deposition testimony transcripts may be uploaded using the deposition testimony transcript icons (e.g., one at a time).

At 2345, the method 2300 includes receiving information representative of one or more designations sets corresponding to the one or more deposition testimony transcripts. In an embodiment, each of the one or more designation sets may be associated with a particular designation category, where the particular designation category is selected from the group of designation categories including: a plaintiff affirmative category, a defense counter category, a defense affirmative category, a plaintiff counter category, and/or custom user categories. In an embodiment, the designations may be received via text input, as illustrated with respect to FIGS. 19A-19C. In an additional or alternative embodiment, the designations may be received via highlighting, as illustrated with respect to FIG. 19D.

In an embodiment, the method 2300 may further include, for each of the one or more designations sets: 1) automatically performing error checking with respect to a particular designation set of the one or more designation sets; 2) determining whether a sort designations control is set to a first value or a second value, where the first value indicates that the designations of the particular designation set should be sorted by page and line number, and the second value indicates that the designations are not to be sorted by page and line number (e.g., as described with reference to the sort designations control 1914 of FIG. 19A); 3) organizing the designations within the particular designation set based on whether the sort designations control is set to the first value or the second value, as described with reference to FIG. 19A; 4) determining a state of a split designations by page control (e.g., the split designations by page control 1916 of FIG. 19A), where a first state of the split designations by page control indicates that designations within the particular designation set that span multiple pages should be split across pages, and a second state indicates that the designations within the particular designation set that span multiple pages should not be split across pages; and 5) splitting the designations within the particular designation set by page based on whether the split designations by page control is set to the first state or the second state, as described with reference to FIG. 19A.

At 2346, the method 2300 includes pinning a deponent to a top of the GUI. The pinning of the deponent causes the deponent to be positioned at the top of a list of deponents for the designation project. In an embodiment, the pinning may be initiated in response to an input received via one of the pin controls 1842, as described with reference to FIG. 18B.

In an embodiment, the method 2300 may include receiving additional inputs indicating a selection of one or more deponents for which designations of deposition transcript testimony has been received. In an embodiment, the additional inputs may be provided via selection of one or more of the radio buttons 1840A-1840E. In response to receiving the additional inputs, the method 2300 may include processing, for each of the one or more selected deponents, the designations to generate processed deposition transcript testimony. In an embodiment, the processed deposition transcript testimony may include a markup of the deposition transcript testimony, and the markup may indicate the designations. In an embodiment, the markup may include highlighting of one or more lines of text within the deposition transcript testimony, as illustrated with reference to FIG. 22A. In an additional or alternative embodiment, the markup may include highlighting within a margin of the deposition transcript testimony, as illustrated with reference to FIG. 22B. In an embodiment, the markup may use different colors to represent the designation categories. In an embodiment, the method 2300 may include generating one or more outputs associated with received designations. For example, the one or more outputs may include error log reports, as illustrated in FIG. 18J, designation reports, as illustrated in FIG. 18K, objection reports, as illustrated in FIG. 18L, and run-time reports, as illustrated in FIG. 18M.

In an embodiment, the GUI may provide a control for configuring line settings for the deposition project. In an embodiment, the control for configuring the line settings may be the line control of FIG. 20 and, once configured, may be applied to all deposition testimony transcripts added to the designation project. In an additional or alternative embodiment, the line control may be the line control 1912 of FIG. 19A, and, once configured, may be applied to a single deposition testimony transcript of the designation project.

In an embodiment, the method 2300 may include determining whether a designation set with respect to a first deposition testimony transcript includes a same designation in different designation categories, and assigning the designation to a single designation category. For example, if a plaintiff affirmative designation includes a particular designation, and another designation category (e.g., a defendant counter category, a defendant affirmative category, or a plaintiff counter category) also includes the particular designation, the designation may be assigned to the earlier designated category and may be omitted from the later designated category. For example, if the particular designation was previously designated as a plaintiff counter designation, and subsequently designated as a plaintiff affirmative designation, the particular designation may be assigned to the plaintiff counter designation category, and omitted from the plaintiff affirmative category. It is noted that other techniques may be used when assigning duplicate designations to categories (e.g., a last in/first out technique, etc.), and the above described technique is provided for purposes of illustration, rather than by way of limitation.

In an embodiment, one or more of the deposition testimony transcripts may be associated with a video file corresponding to a video recording of the deposition testimony. In such instances, the method may include generating a designation video that includes excerpts of the video corresponding to designated portions of the deposition testimony recorded in the video. For example, the designations may be made in the manner described above with respect to FIGS. 19A-19D, and portions of the video corresponding to the designations may be excerpted from the video to create the designation video. In an embodiment, the method 2300 may generating a file image, as described with reference to FIG. 18F, and the file image may be provided to a third party software that creates the designation video. In an embodiment, the method may include calculating a run-time of the designation video. The run-time of the designation video may be automatically calculated as the designations are provided. In an additional or alternative embodiment, the run-time may be calculated in response to an input received via one or more of the GUIs. In an embodiment, the designation video is generated using third party software.

In an embodiment, the method 2300 may include maintaining an archive associated with the designation project. The archive may store information representative of a history of the designation project, and may include a log that identifies modifications to files of the designation project, as described with reference to FIG. 18G. Additionally, the archive may maintain unmodified copies of deposition testimony transcripts and recordings.

It is noted that the functional blocks, modules and processes illustrated in FIGS. 5 and 10-16 and 23 may comprise or utilize processors, electronics devices, hardware devices, electronics components, logical circuits, memories, software codes, firmware codes, etc., or any combination thereof. Further, it is noted that the functionality described may be implemented entirely in a standalone program or could be implemented as a functional plugin to an existing program. For example, existing trial designation programs may be provided with a plugin functionality which accesses designations and implements the described error checking, quarantining, etc.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for managing and processing deposition testimony transcript designations, the method comprising:
   receiving, by a designation server, a request to create a designation project from to a user device, wherein the request is received at the server from the user device via a network connection;
   in response to receiving the request, providing, by the designation server, a graphical user interface (GUI) to the user device, wherein the GUI provides functionality to create and manage projects relating to designation of deposition testimony transcripts;
   receiving, by the designation server, inputs corresponding to user interaction with the GUI from the user device; and
   in response to receiving the inputs at the designation server:
   generating a designation project;
   in response to generating the designation project, updating the GUI to indicate that the designation project has been created and exists in the designation server;
   receiving one or more deposition testimony transcripts associated with deposition testimony of a deponent;
   receiving information representative of one or more designations sets corresponding to the one or more deposition testimony transcripts, wherein each of the one or more designation sets is associated with a particular designation category;
   processing the one or more received designation sets and storing the processed designation sets in at least one designation file on the designation server; and
   generating a processed transcript for display based on the processed designation sets.

2. The method of claim 1, wherein the method includes: for each of the one or more designations sets:
   automatically performing error checking with respect to a particular designation set of the one or more designation sets.

3. The method of claim 2 further comprising, for each of the one or more designation sets:
   determining whether a sort designations control is set to a first value or a second value, wherein the first value indicates that the designations of the particular designation set should be sorted by page and line number, and wherein the second value indicates that the designations are not to be sorted by page and line number;
   organizing the designations within the particular designation set based on whether the sort designations control is set to a first state or a second state;
   determining a state of a combine designations control, wherein the first state of the combine designations control indicates that overlapping designations within the particular designation set should be consolidated, and wherein the second state indicates that the designations within the particular designation set should not be consolidated; and
   consolidating the designations within the particular designation set based on whether the combine designations control is set to the first state or the second state.

4. The method of claim 1, wherein the method includes assigning one or more users to the designation project, wherein each of the one or more assigned users is associated with a role that identifies a set of permissions that each of the one or more assigned users are authorized to perform with respect to the designation project.

5. The method of claim 1, wherein the method includes:
   receiving additional inputs indicating a selection of one or more deponents for which designations of deposition transcript testimony has been received; and processing, for each of the one or more selected deponents, the designations to generate processed deposition transcript testimony, wherein the processed deposition transcript testimony includes a markup of the deposition transcript testimony, and wherein the markup indicates the designations.

6. The method of claim 5, wherein the markup includes highlighting of one or more lines of text within the deposition transcript testimony.

7. The method of claim 5, wherein the markup uses a different display appearance to represent the designation categories.

8. A non-transitory computer-readable storage medium storing instructions that, when executed by a processor, cause the processor to perform operations for managing and processing deposition testimony transcript designations, the operations comprising:
  receiving, by a designation server, a request to create a designation project from to a user device, wherein the request is received at the server from the user device via a network connection;
  in response to receiving the request, providing, by the designation server, a graphical user interface (GUI) to the user device, wherein the GUI provides functionality to create and manage projects relating to designation of deposition testimony transcripts;
  receiving, by the designation server, inputs corresponding to user interaction with the GUI from the user device; and
  in response to receiving the inputs at the designation server:
    generating a designation project;
    in response to generating the designation project, updating the GUI to indicate that the designation project has been created and exists in the designation server;
    receiving one or more deposition testimony transcripts associated with deposition testimony of a deponent;
    receiving information representative of one or more designations sets corresponding to the one or more deposition testimony transcripts, wherein each of the one or more designation sets is associated with a particular designation category;
    processing the one or more received designation sets and storing the processed designation sets in at least one designation file on the designation server; and
    generating a processed transcript for display based on the processed designation sets.

9. The non-transitory computer-readable storage medium of claim 8, wherein the GUI provides a control for configuring line settings for the designation project, and wherein the line settings, once configured, are applied to all deposition testimony transcripts added to the designation project.

10. The non-transitory computer-readable storage medium of claim 8, wherein the operations include:
  determining whether a designation set with respect to a first deposition testimony transcript includes a same designation in different designation categories; and
  assigning the designation to a single designation category.

11. The non-transitory computer-readable storage medium of claim 8, wherein at least one of the deposition testimony transcripts is associated with a video corresponding to a recording of the deposition testimony, and wherein the operations include initiate generation of a designation video that includes excerpts of the video corresponding to designated portions of the deposition testimony recorded in the video.

12. The non-transitory computer-readable storage medium of claim 11, wherein the operations include calculating a run-time of the designation video.

13. The non-transitory computer-readable storage medium of claim 11, wherein the designation video is generated using third party software.

14. An apparatus for managing and processing deposition testimony transcript designations, the apparatus comprising:
  at least one processor configured to:
    receive a request to create a designation project from to a user device, wherein the request is received from the user device via a network connection;
    in response to receiving the request, provide a graphical user interface (GUI) to the user device, wherein the GUI provides functionality to create and manage projects relating to designation of deposition testimony transcripts;
    receive inputs corresponding to user interaction with the GUI from the user device; and
    in response to receiving the inputs:
      generate a designation project;
      in response to generating the designation project, update the GUI to indicate that the designation project has been created and exists in the designation server;
      receive one or more deposition testimony transcripts associated with deposition testimony of a deponent;
      receive information representative of one or more designations sets corresponding to the one or more deposition testimony transcripts, wherein each of the one or more designation sets is associated with a particular designation category;
      process the one or more received designation sets and storing the processed designation sets in at least one designation file on the designation server;
      generate a processed transcript for display based on the processed designation sets; and
  a memory coupled to the processor.

15. The apparatus of claim 14, wherein the GUI provides a control for configuring line settings for the designation project, and wherein the line settings, once configured, are applied to all deposition testimony transcripts added to the designation project.

16. The apparatus of claim 14, wherein the at least one processor is configured to:
  determine whether a designation set with respect to a first deposition testimony transcript includes the same designation in different designation categories; and
  assign the same designation to a single designation category.

17. The apparatus of claim 14, wherein at least one of the deposition testimony transcripts is associated with a video corresponding to a recording of the deposition testimony, and wherein the at least one processor is configured to initiate generation of a designation video that includes excerpts of the video corresponding to designated portions of the deposition testimony recorded in the video.

18. The apparatus of claim 17, wherein the at least one processor is configured to calculate a run-time of the designation video.

19. The apparatus of claim 17, wherein the designation video is generated using third party software.

20. The apparatus of claim 14, wherein the at least one processor is configured to maintain an archive associated with the designation project, wherein the archive stores information representative of a history of the designation project, and wherein the history of the designation project include a log that identifies modifications to files of the designation project.

* * * * *

UNITED STATES PATENT AND TRADEMARK OFFICE
CERTIFICATE OF CORRECTION

PATENT NO. : 10,229,098 B2
APPLICATION NO. : 15/970842
DATED : March 12, 2019
INVENTOR(S) : Christopher John Grimm Page 1 of 1

It is certified that error appears in the above-identified patent and that said Letters Patent is hereby corrected as shown below:

In the Specification

At Column 16, Line number 43, delete "interne" and replace with --internet--.
At Column 16, Line number 54, delete "interne" and replace with --internet--.
At Column 20, Line number 36, delete "FIG. 18I" and replace with --FIG. 18I--.
At Column 23, Line number 31, delete "using, the third" and replace with --using the third--.
At Column 23, Line number 32, delete "FIG. 18E" and replace with --FIG. 18F--.
At Column 23, Line number 46, delete "FIG. 18E" and replace with --FIG. 18F--.

Signed and Sealed this
Thirtieth Day of April, 2019

Andrei Iancu
*Director of the United States Patent and Trademark Office*